(12) United States Patent
Yamasaki et al.

(10) Patent No.: US 6,246,182 B1
(45) Date of Patent: Jun. 12, 2001

(54) ELECTRONIC TRACK LIGHTING SYSTEM

(75) Inventors: Shigeaki Yamasaki; Hiroyuki Sako, both of Osaka (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/563,166

(22) Filed: May 1, 2000

(30) Foreign Application Priority Data

Jun. 25, 1999 (JP) .................................................. 11-179115
Jun. 25, 1999 (JP) .................................................. 11-179116
Sep. 27, 1999 (JP) .................................................. 11-273310

(51) Int. Cl.[7] ................................................. H05B 37/02
(52) U.S. Cl. ....................... 315/209 R; 315/276; 315/71; 315/312
(58) Field of Search ................................ 315/209 R, 247, 315/276, 291, 56, 70, 71, 312, 318, 361, 206, 210

(56) References Cited

U.S. PATENT DOCUMENTS

| | | | |
|---|---|---|---|
| 5,180,952 | 1/1993 | Nilssen .................................. | 315/210 |
| 5,640,069 * | 6/1997 | Nilssen .............................. | 315/209 R |
| 5,691,603 * | 11/1997 | Nilssen .............................. | 315/209 R |
| 6,066,921 * | 5/2000 | Nakamura et al. ..................... | 315/71 |
| 6,079,862 | 6/2000 | Kawashima et al. .............. | 364/167.6 |

FOREIGN PATENT DOCUMENTS 2770337    4/1998   (JP) .

* cited by examiner

Primary Examiner—Haissa Philogene
(74) Attorney, Agent, or Firm—Greenblum & Bernstein, P.L.C.

(57) ABSTRACT

An electronic track lighting system comprises a power supply filter circuit having an input connected to an alternating current power supply AC, a rectifier circuit connected to an output of the power supply filter circuit, an inverter circuit connected to an output of the rectifier circuit and outputting a high frequency voltage by on/off operation of switching elements therein, a lamp load, and a power track providing supply voltage to the lamp load. The lighting system further comprises a first unit which is interposed between the AC power supply and an input of the power track and includes at least the power supply filter circuit, and a second unit which is provided as a structure independent from the first unit, is connected to the power track and outputs a high frequency voltage to the lamp load.

22 Claims, 22 Drawing Sheets

ELECTRONIC TRACK LIGHTING SYSTEM

CROSS REFERENCES TO RELATED APPLICATIONS

This application is based on Japanese Patent Application Nos. 11-179115, 11-179116 and 11-273310, the contents of which are incorporated herein by reference.

BACKGROUND OF THE INVENTION

1. Field of the Invention

The present invention relates to an electronic track lighting system, and in particular, to a lighting system which lights a lamp load such as a halogen lamp at a high frequency by an inverter circuit using an electric power fed via a power track.

2. Description of the Related Art

Conventionally, an inverter circuit disclosed in Japanese Patent No. 2770337 has been well known as an inverter circuit for lighting a halogen lamp, and the disclosed circuit has a configuration as shown in FIG. 17. In the inverter circuit, a portion surrounded by a broken line shown in FIG. 12 is provided as a unit. The inverter circuit is built in a transformer unit A and is used together with a lamp load 3 in the form as shown in FIG. 13. As shown in FIG. 14, the electronic transformer unit A is connected to a power track 6 mounted on a ceiling via a power track connective portion 4 provided on an upper portion thereof. A commercial alternating current voltage of AC 100V is supplied to the electronic transformer unit A through the power track 6. A lamp unit 5 suspended from a lower portion of the electronic transformer unit A is mounted with a lamp load 3 such as a halogen lamp or the like.

For example, such a luminaire (lighting equipment) is used for showcase (display case) lighting, light up of show windows, and it is strongly desired that the electronic transformer unit A connected to the power track 6 is miniaturized. However, the prior art employing the aforesaid 100V power track system has the following problem. More specifically, as seen from a circuit shown in FIG. 15, each of a plurality of the electronic transformer units A includes a filter circuit for reducing a power supply feedback noise and a protective circuit for protecting a circuit when a lightning surge is applied, respectively. Therefore, size of the electronic transformer unit A becomes large.

A 12V power track system as shown in FIG. 16 is often used in general, and is constructed in the following manner that a secondary side (output side) of an output transformer T1 of the electronic transformer unit A is connected to the power track 6, and a plurality of 12V mini-halogen lamps are connected to the power track 6 via a lamp unit to be lit. In this case, the power track 6 is supplied with a high frequency voltage of 12V transformed from a commercial supply voltage of AC 100V by the electronic transformer unit A.

Moreover, in U.S. Pat. No. 5,180,952, proposed is a method of supplying, to the power track system, a voltage which is converted from a commercial power supply voltage into a high frequency voltage to downsize each unit.

In the AC 100V power track system as shown in FIGS. 14 and 15, the electronic transformer unit A must be connected one by one with the power track. Therefore, depending upon a size of the electronic transformer unit A connected to the power track 6, there is a limitation of the number of electronic transformer units A capable of being connected to a predetermined length of the power track. Conversely, comparing to the 12V power track system, a current flowing through the power track 6 is less, and thus the AC 100V power track system has a merit such that a voltage drop by an impedance of the power track 6 is smaller than the 12V power track system and does not affect brightness of the light unit.

On the other hand, in the high frequency 12V power track system shown in FIG. 16, one electronic transformer unit A is shared with a plurality of halogen lamps 3. Therefore, each halogen lamp 3 is connected to the power track 6 by only lamp unit 5. As a result, the high frequency 12V power track system has merit such that the whole of lighting system can be miniaturized. However, as described above, a voltage is low, that is, 12V, and thus a current flowing through the power track 6 is 9 times as much as the AC 100V power track system. Therefore a voltage drop by an impedance component of the power track 6 is large, and when the long power track is used, the lamp unit far from the transform unit A becomes dark. Moreover, in attaching/detaching the lamp unit 5 to/from the power track 6, there is the following problem. Since a current flowing through a connective fitting 4 with the power track 6 is large, an arc is generated at the attaching or detaching.

The present invention has been made in view of the above problems in the prior art. It is therefore an object of the present invention to provide a lighting system which can suppress a current flowing through a power track so that no arc is generated between a connective metal fitting and the power track when attaching and detaching a lamp unit.

SUMMARY OF THE INVENTION

In order to solve the above problems, the present invention provides a lighting system having a power supply filter circuit having an input end connected to an alternating current power supply (and including a fuse, a surge absorber, a filter capacitor, a line filter check, etc.), a rectifier circuit connected to an output end of the power supply filter circuit, an inverter circuit for outputting a high frequency voltage, the inverter circuit being connected to an output end of the rectifier circuit and having switching elements through which the inverter circuit is controlled by on and off operation thereof, a lamp load which receives a high frequency output from the inverter circuit to light, a power track for providing a supply voltage to the lamp load. The lighting system further comprises a first unit which includes at least the power supply filter circuit, and a second unit for outputting a high frequency voltage to the lamp load. The first unit is interposed between the alternating current power supply and an input end of the power track. The second unit is connected to the power track. The first and second units are provided as structures separate from each other. At least one second unit is connected to the power track.

DESCRIPTION OF THE PREFERRED EMBODIMENTS

Preferred embodiments of a lighting system of the present invention will be described in detail below with reference to the accompanying drawings.

(First Embodiment)

Figure 1:
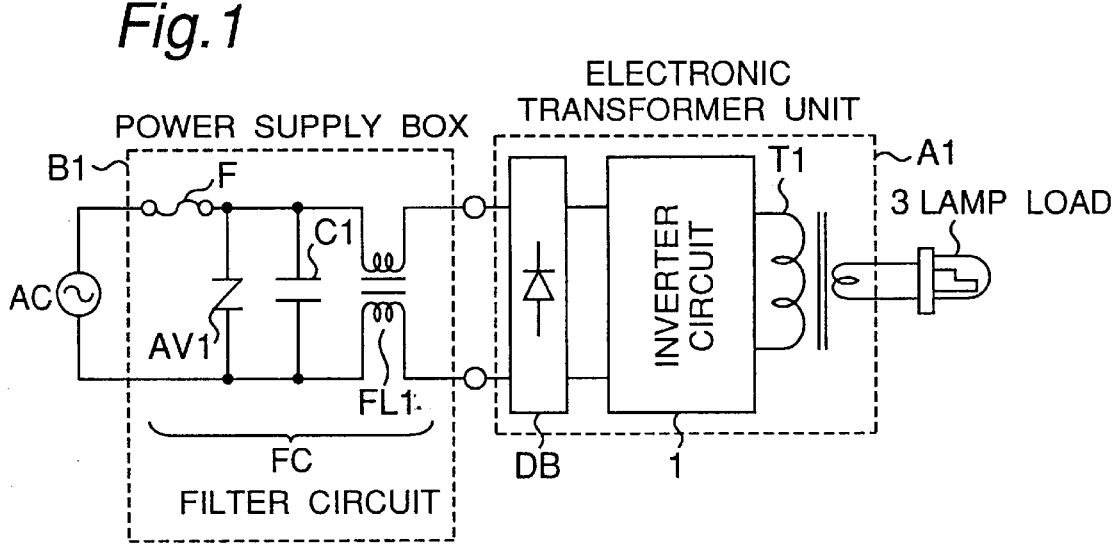
FIG. 1 is a circuit diagram showing an organization of a power supply box and an electronic transformer unit according to a first embodiment of the present invention.

FIG. 1 is a circuit diagram showing an organization of a lighting system according to a first embodiment of the present invention. As shown in FIG. 1, a lighting system has a power supply filter circuit FC having an input end connected to an alternating current power supply AC, a rectifier circuit DB connected to an output end of the power supply filter circuit FC, an inverter circuit 1 for outputting a high frequency voltage, and a lamp load 3 which receives a high frequency output from the inverter circuit 1. The inverter circuit 1 is connected to an output end of the rectifier circuit DB and has switching elements through which the inverter circuit 1 is controlled by on and off operation thereof.

According to this first embodiment, the lighting system is provided with a power supply box B1, and an electronic transformer unit A1 which is a structure separate from the power supply box B1. The power supply box B1 includes the power supply filter circuit FC which comprises a fuse F, a surge absorber AV1, a filter capacitor C1 and a line filter chock FL1. The fuse F and the surge absorber AV1 are operated as a protective circuit for protecting a circuit from over-voltage, over-current or the like. The filter capacitor C1 and the line filter chock FL1 are operated as a high frequency blocking filter for preventing a high frequency noise component from leaking into an AC power supply line. The electronic transformer unit A1 includes a diode bridge DB, the inverter circuit 1 and an output transformer T1. The power supply box B1 receives the alternating current power supply AC, and outputs an alternating current (AC) voltage without a noise component therein. The electronic transformer unit A1 receives the AC voltage passing through the power supply box B1, then transforms it to a high frequency 12V, and thereafter supplies the high frequency 12V to the lamp load 3 such as a halogen lamp so as to light the lamp load 3.

Figure 2:
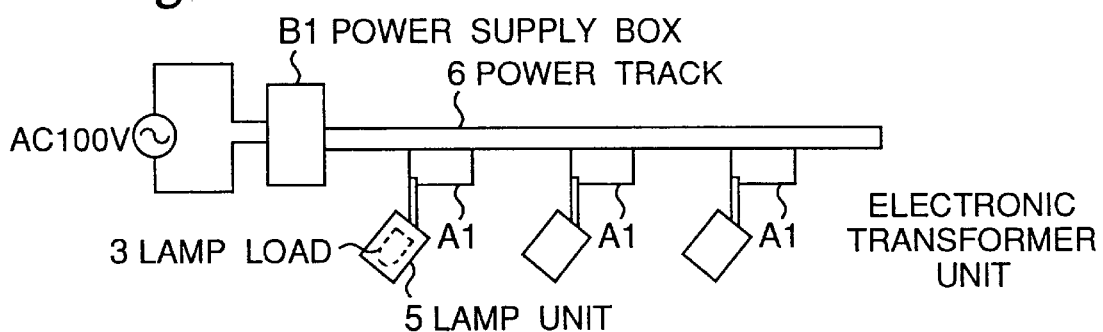
FIG. 2 is a view to explain a state that a plurality of electronic transformer units are connected to the power supply box via a power track in the first embodiment of the present invention.

As shown in FIG. 2, the power supply box B1 is connected to an input terminal of a power track 6. The electronic transformer unit A1 is provided in a lamp unit 5 corresponding to each lamp load 3.

Figure 3:
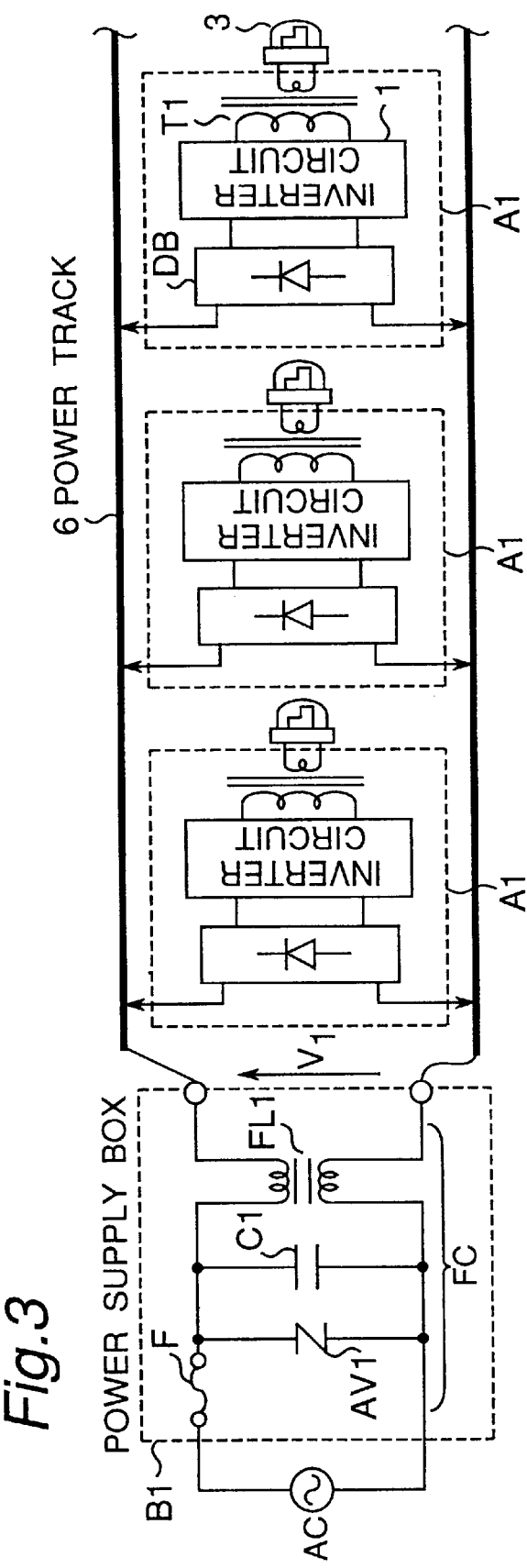
FIG. 3 is a circuit diagram of the case where a plurality of electronic transformer units are connected to the power supply box via a power track in the first embodiment of the present invention.
Figure 4:
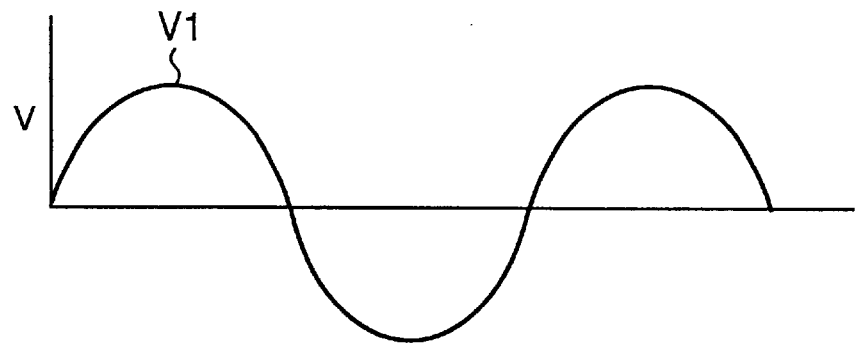
FIG. 4 is a view showing a waveform of an output voltage of the power supply box of the first embodiment of the present invention.

FIG. 3 shows a state that the power supply box B1 and the electronic transformer unit A1 of this first embodiment are connected with the power track 6. In this case, an AC voltage V1 as shown in FIG. 4 passing through the power supply box B1 is supplied to the power track 6.

Figure 17:
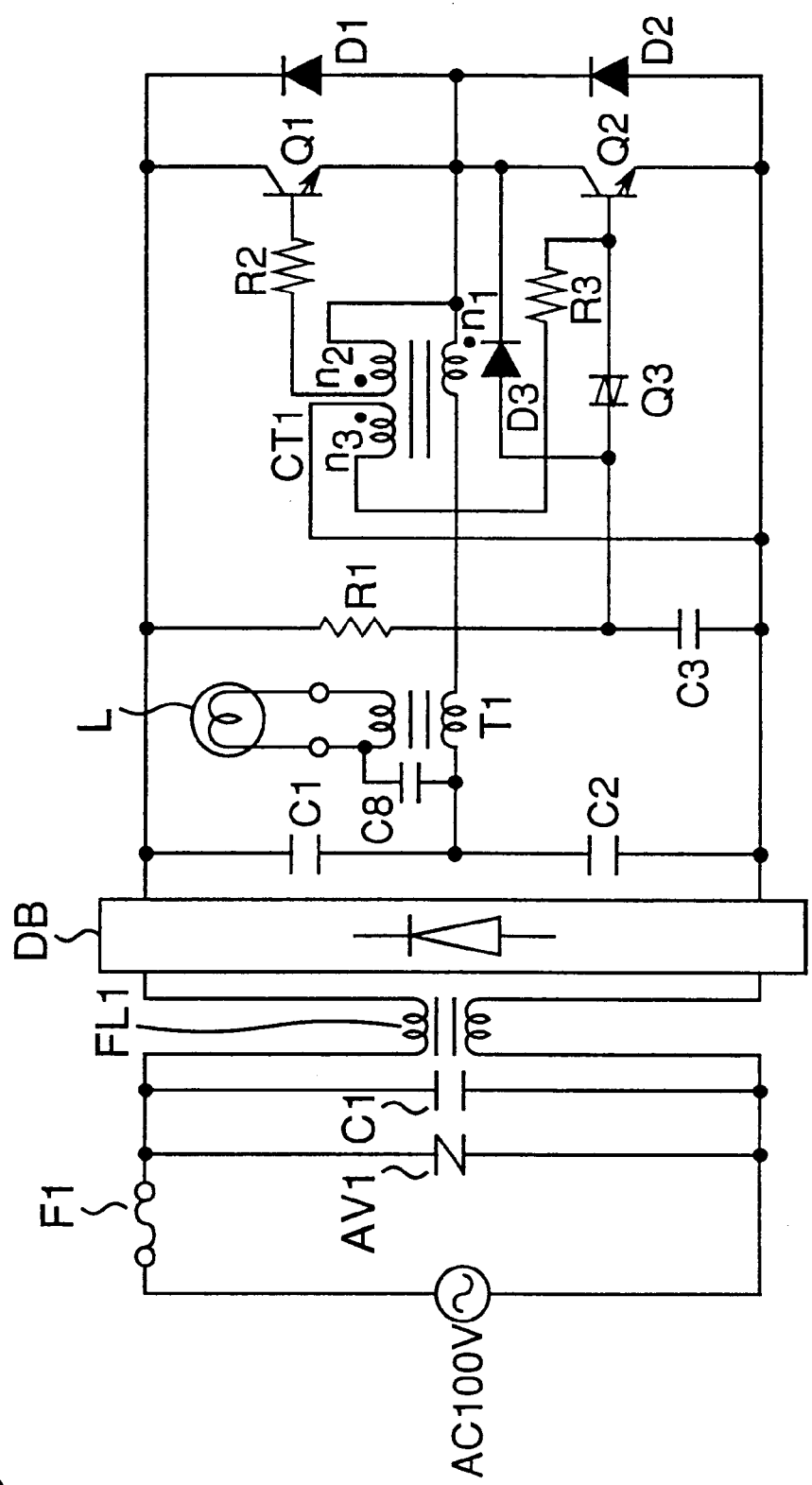
FIG. 17 is a circuit diagram showing a detailed organization of a conventional electronic transformer unit.

In the lighting system of this first embodiment, the power supply box B1 includes the power supply filter circuit FC therein, and thereby, as shown in FIG. 3, one power supply box B1 connected to the power track 6 can be shared by a plurality of electronic transformer units A1. In other words, the plurality of electronic transformer units A1 can be supplied with a power from one power supply box B1. Therefore, each electronic transformer unit A1 has no need of including a power supply filter circuit FC which comprises a fuse F, a surge absorber AV1, a filter capacitor C1 and a line filter chock FL1, as shown in FIG. 17, and each lamp unit can be miniaturized. Moreover, feeding AC100V to the power track 6 can also solve the problem of arc generated when the lamp unit is attached or detached due to increasing a current in the track as seen in the prior art employing a 12V power track system.

Further, the electronic transformer unit A1 is received in a box (housing) which is removably fastened to and connected with the power track via a connecting metal fitting such that the box can be freely detached from and attached to the power track. The lamp load is provided in a lamp unit suspended from the box. By doing so, when the box is attached to the power track 6, the lamp load is immediately turned on, while when the box detached or removed from the power track 6, the lamp load is immediately turned off. Therefore, no flashing switch is required. As a result, it is possible to miniaturize and lighten the lightning system.

(Second Embodiment)

Figure 5:
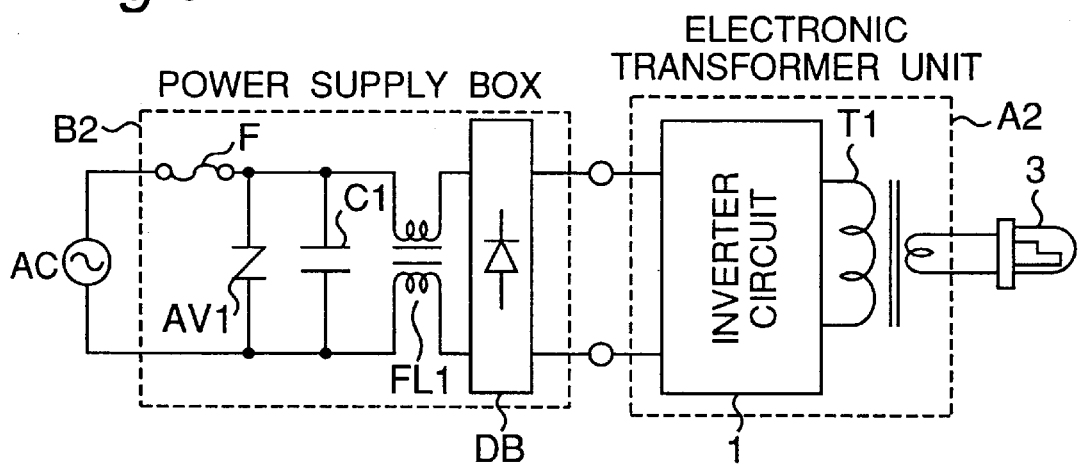
FIG. 5 is a circuit diagram showing an organization of a power supply box and an electronic transformer unit according to a second embodiment of the present invention.

FIG. 5 shows another organization of the lighting system of the present invention.

According to this second embodiment, a lighting system comprises a power supply box B2 including a power supply filter circuit and a diode bridge DB, and an electronic transformer unit A2 including an inverter circuit 1 and an output transformer T1. The power supply box B2 receives an AC power supply AC, then outputs a full-wave rectified ripple direct current (DC) voltage. The electronic transformer unit A2 receives the ripple DC voltage, then transforms it into a high frequency 12V, and thereafter supplies it to a lamp load 3 such as a halogen lamp.

Figure 6:
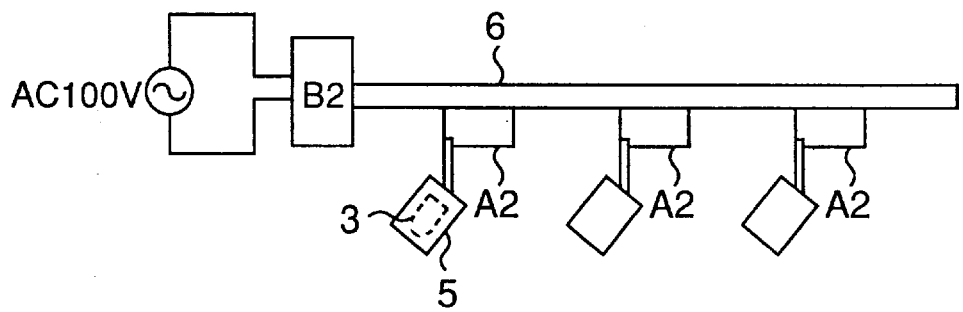
FIG. 6 is a view to explain a state that a plurality of electronic transformer units are connected to the power supply box via a power track in the second embodiment of the present invention.

As shown in FIG. 6, the power supply box B2 is connected to an input terminal of a power track 6, and the electronic transformer unit A2 is provided in a lamp unit 5 corresponding to each lamp load 3.

Figure 7:
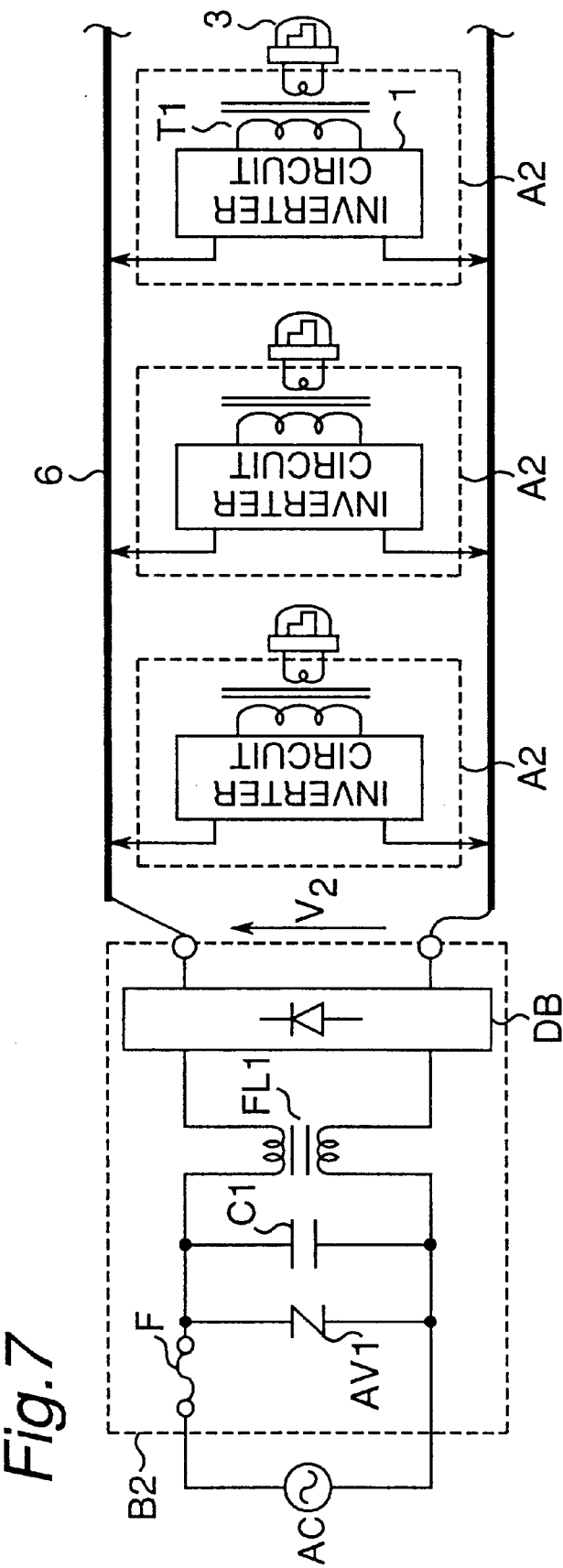
FIG. 7 is a circuit diagram of the case where a plurality of electronic transformer units are connected to the power supply box via a power track in the second embodiment of the present invention.
Figure 8:
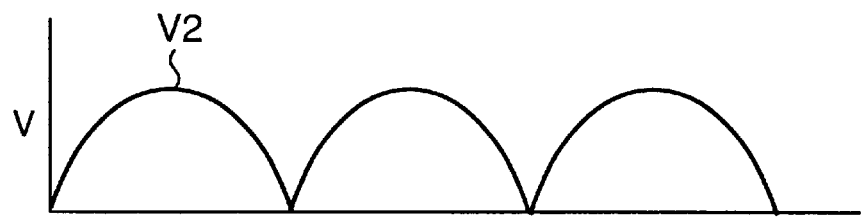
FIG. 8 is a view showing a waveform of an output voltage of the power supply box of the second embodiment of the present invention.

FIG. 7 shows a state that a plurality of the electronic transformer units A2 are connected to the power track 6. In the example shown in FIG. 7, a ripple direct current voltage V2 (see FIG. 8) passing through the power supply box B2 is fed to the power track 6. Each electronic transformer unit A2 has no need of including a power supply filter circuit and a diode bridge DB. Therefore, it is possible to achieve a miniaturization of each lamp unit. Moreover, since a 100V of ripple DC voltage is fed to the power track 6, a current of the track increases. Therefore it is possible to solve the problem of arc generated on attaching and detaching a lamp unit seen in the prior art employing a 12V power track system.

(Third Embodiment)

Figure 9:
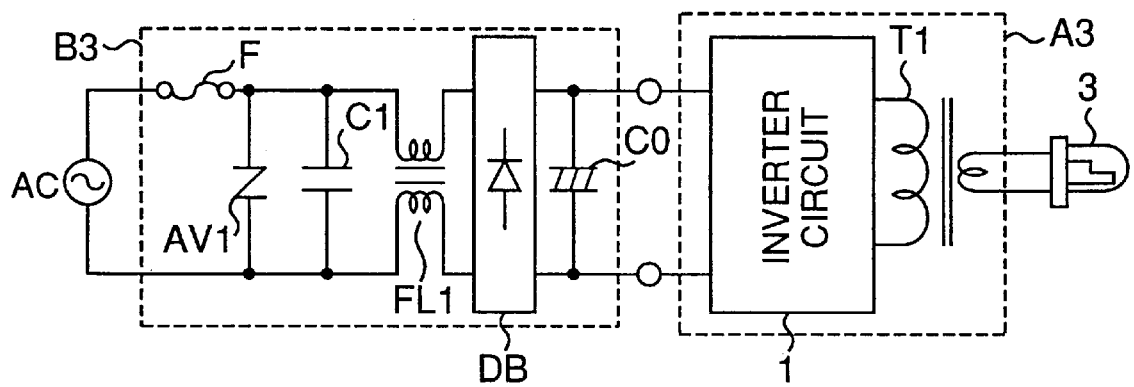
FIG. 9 is a circuit diagram showing an organization of a power supply box and an electronic transformer unit according to a third embodiment of the present invention.

FIG. 9 shows still another organization of the lighting system of the present invention.

According to this third embodiment, a lighting system comprises a power supply box B3 including a power supply filter circuit, a diode bridge DB and a smoothing capacitor C0, and an electronic transformer unit A3 including an inverter circuit 1 and an output transformer T1. The power supply box B3 receives an AC power supply AC, then outputs a rectified and smoothened DC voltage. The electronic transformer unit A3 receives the DC voltage, then transforms it into a predetermined high frequency voltage, and thereafter supplies it to a lamp load 3 such as a halogen lamp.

Figure 10:
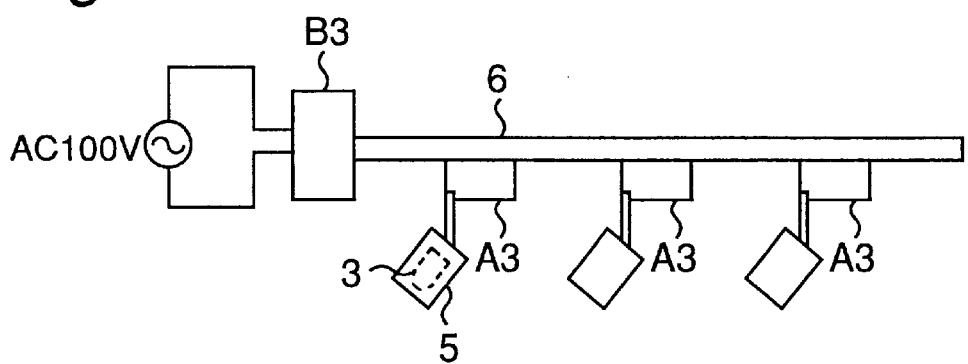
FIG. 10 is a view to explain a state that a plurality of electronic transformer units are connected to the power supply box via a power track in the third embodiment of the present invention.

As shown in FIG. 10, the power supply box B3 is connected to an input terminal of a power track 6. The electronic transformer unit A3 is located onto a part of a lamp unit 5 corresponding to each lamp load 3. In the case of this third embodiment, a DC voltage V3 passing through the power supply box B3 is fed to the power track 6. Each electronic transformer unit A3 has no need of including a power supply filter circuit and a diode bridge DB. Therefore, it is possible to achieve a miniaturization of each transformer unit. Further, since a DC voltage of about 140V is fed to the power track 6, it is possible to solve the problem of arc generated when attaching and detaching a lamp fitting seen in the prior art employing a 12V power track system. Furthermore, it is possible to connect an inverter circuit for a fluorescent lamp load, thereby achieving a miniaturization.

Figure 11:
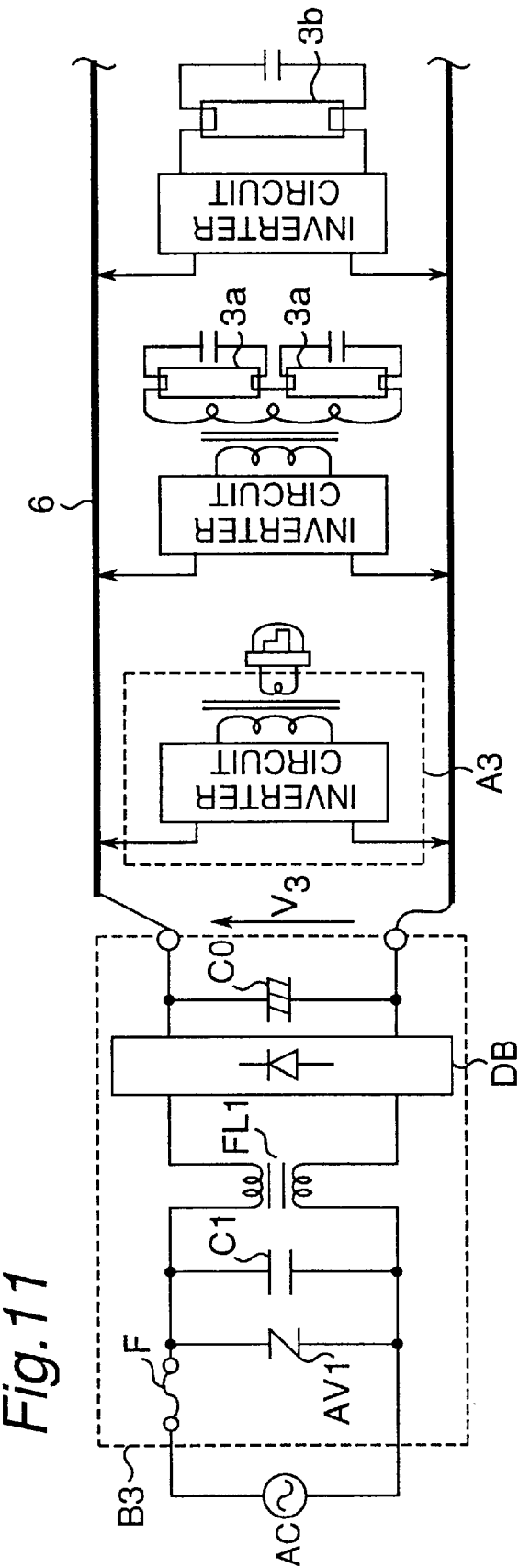
FIG. 11 is a circuit diagram of the case where a plurality of electronic transformer units are connected to the power supply box via a power track in the third embodiment of the present invention.
Figure 12:
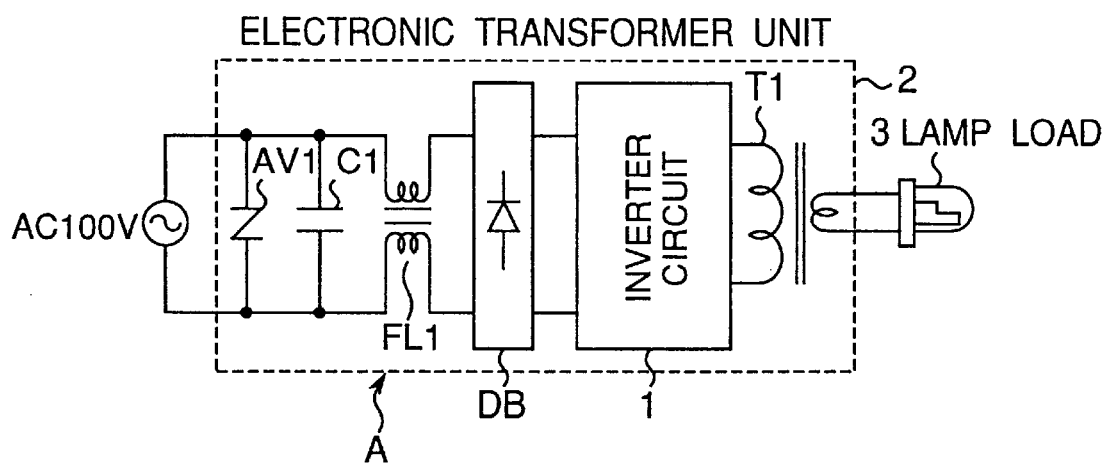
FIG. 12 is a circuit diagram showing an internal organization of a conventional electronic transformer unit.
Figure 13:
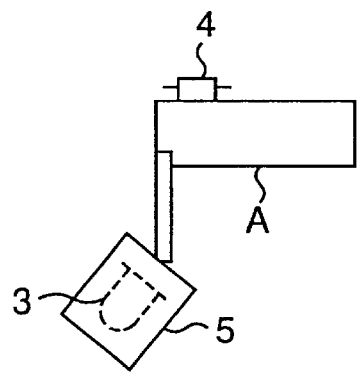
FIG. 13 is a view to explain an appearance of the conventional electronic transformer unit.
Figure 14:
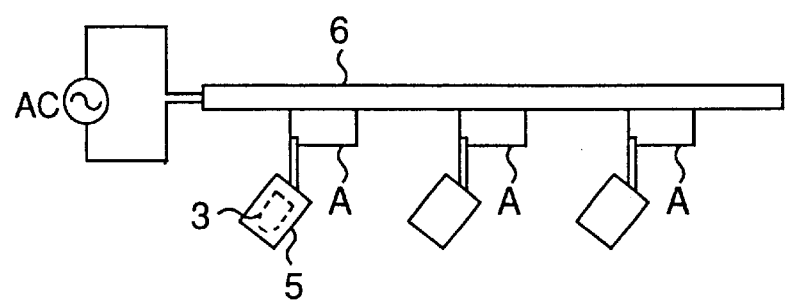
FIG. 14 is a view to explain a state that a plurality of conventional electronic transformer units are connected to a power track.
Figure 15:
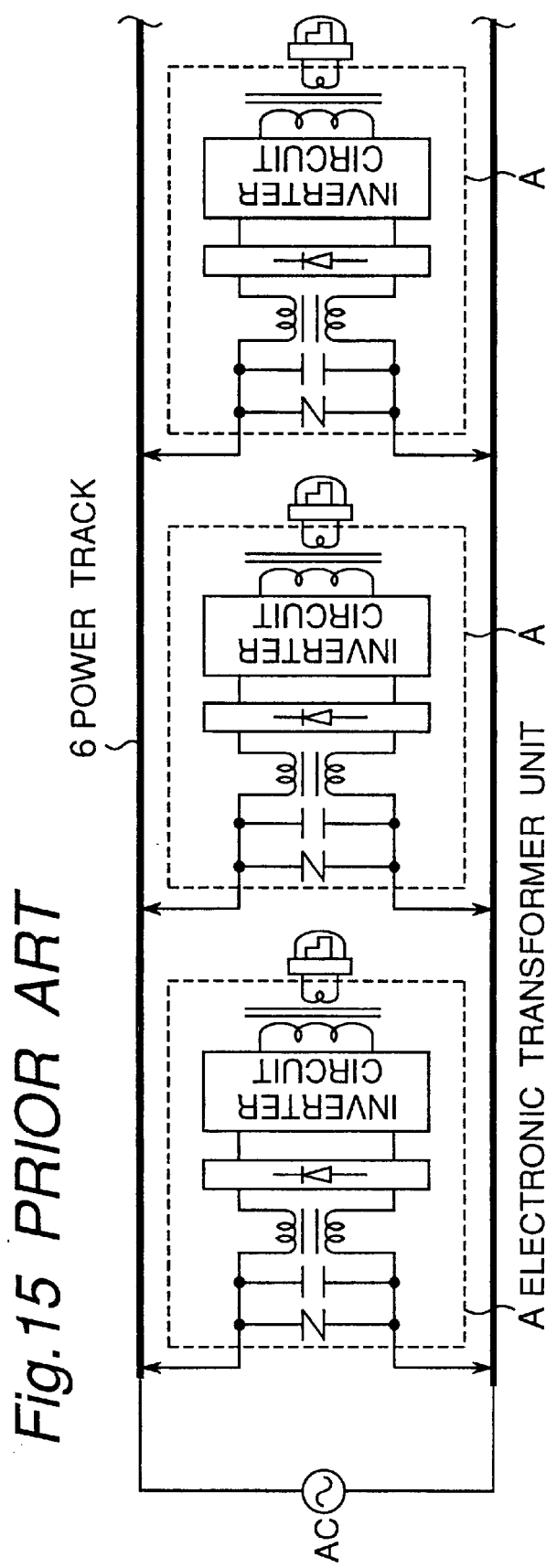
FIG. 15 is a circuit diagram to explain an AC 100V feeding system by a conventional power track.
Figure 16:
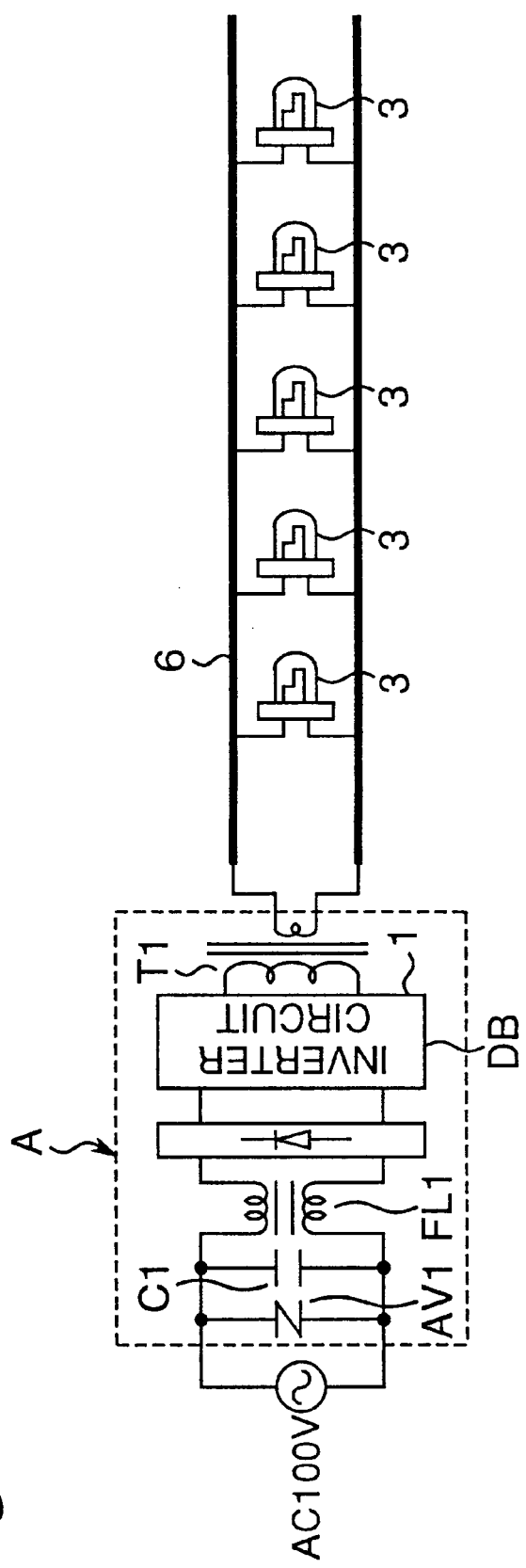
FIG. 16 is a circuit diagram to explain a high frequency 12V feeding system by a conventional power track.

FIG. 11 shows an example of a power track to which a lamp unit for halogen lamp, an output transformer connected with two series fluorescent lamp loads 3a, and an inverter circuit connected with one fluorescent lamp load 36b are connected. A circuit for rectifying and smoothing used for the power supply box B3 may be a chopper circuit having an input power factor correcting function of a commercial AC power supply AC.

The power supply filter circuit in the first, second or third embodiment has no need of having a circuit structure as illustrated above, and may comprise only filter choke or only fuse. The circuit structure may be of course any other form so long as the following conditions are satisfied: a power supply section of the filter circuit is connected to an input section of the power track so that an output voltage of the power supply filter circuit becomes a 100V or 200V of AC output, ripple output, or smoothened DC output; the power supply sections of the lamp unit and the transformer unit connected to the power track are shared to prevent an arc from being generated when attaching and detaching the lamp unit and the transformer unit, thereby achieving a miniaturization of the lamp unit and the transformer unit.

A lamp capable of lighting with a low voltage and large current, a halogen lamp, a fluorescent lamp or HID lamp can be used as the lamp load 3. The equipment connected to the power track is not limited to the above inverter circuit. The power track can be connected with various loads in parallel such as an inverter for a discharge lamp like a fluorescent lamp, and an incandescent lamp.

In addition, the power supply box B1, B2 or B3 shown in the above embodiments may include a circuit for realizing various control functions other than power supply to the electronic transformer unit, together with the power supply filter circuit.

Figure 18A:
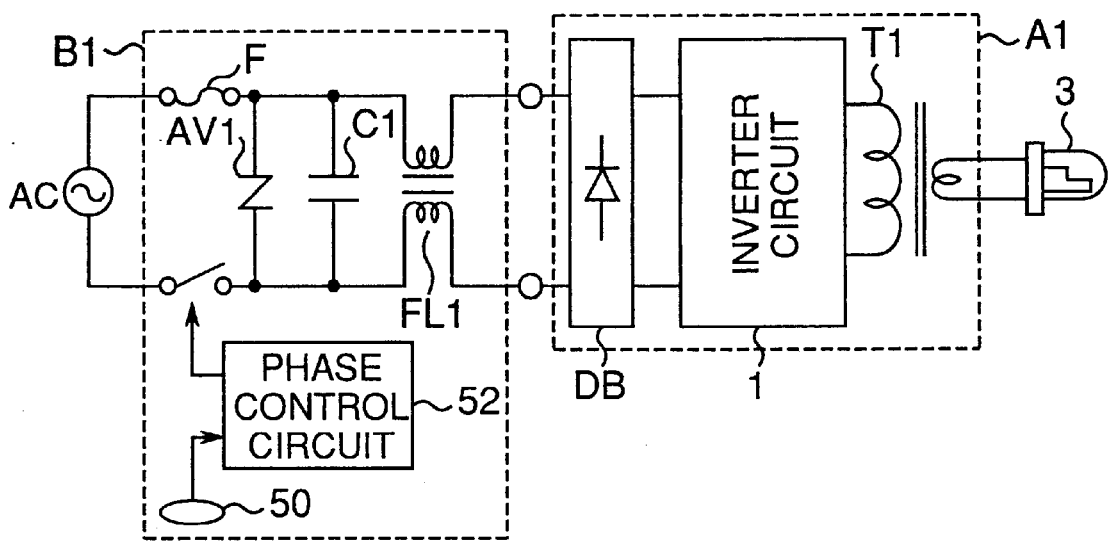
FIGS. 18A, 18B, 18C and 18D are views each showing a state that a power supply box including a control circuit for realizing various control functions other than a supply of power is connected to a power track.
Figure 18B:
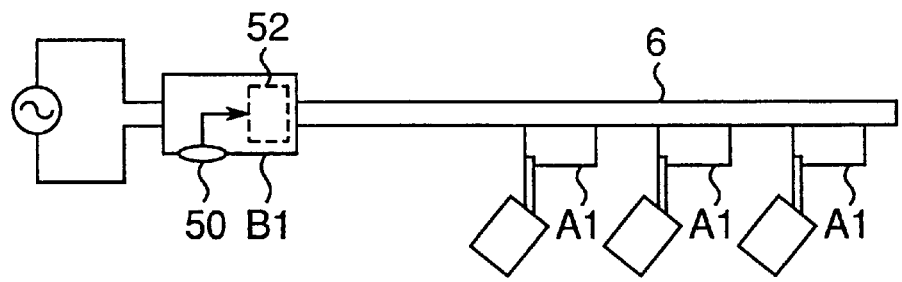

For instance, as shown in FIG. 18A, these power supply box B1, B2 and B3 may include a sensor 50 for detecting human presence, and a phase control circuit 52 which controls a phase of power supply for dimming based on an output of the sensor 50. In this case, as shown in FIG. 18B, a supply voltage supplied to the power track is controlled in its phase by the phase control circuit provided in the power supply box used in common, and thus, is supplied to a plurality of electronic transformer units connected to the identical power track. Therefore, one sensor can control dimming or extinction of a plurality of light units in the block.

Figure 18C:
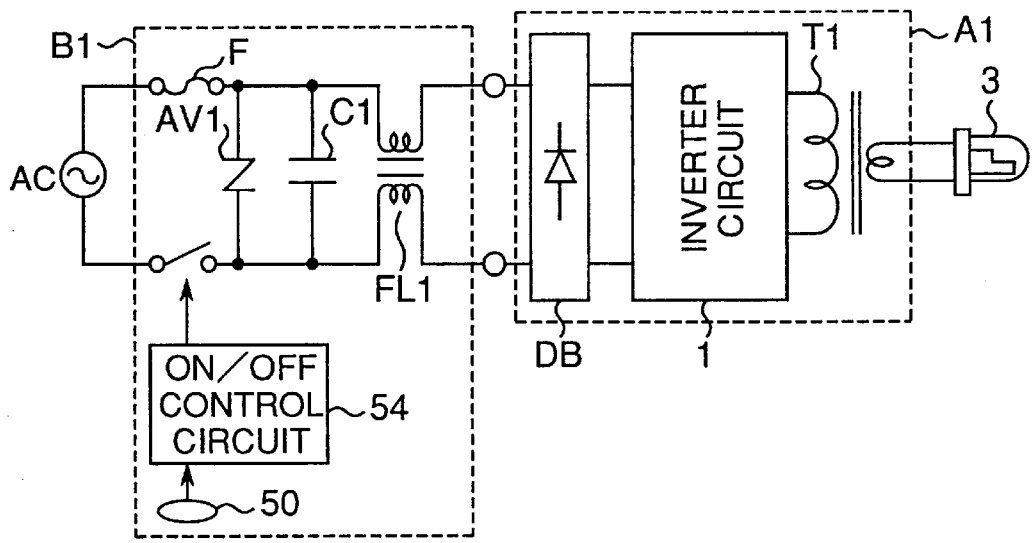

Further, as shown in FIG. 18C, these power supply box B1, B2 and B3 may include a sensor 50 for detecting human presence, and an ON/OFF control circuit 54 for controlling ON/OFF operation of the power supply based on an output of the sensor 50. In this case, it is possible to turn on and off device connected to the power track such as the inverter for the discharge lamp in the block.

Figure 18D:
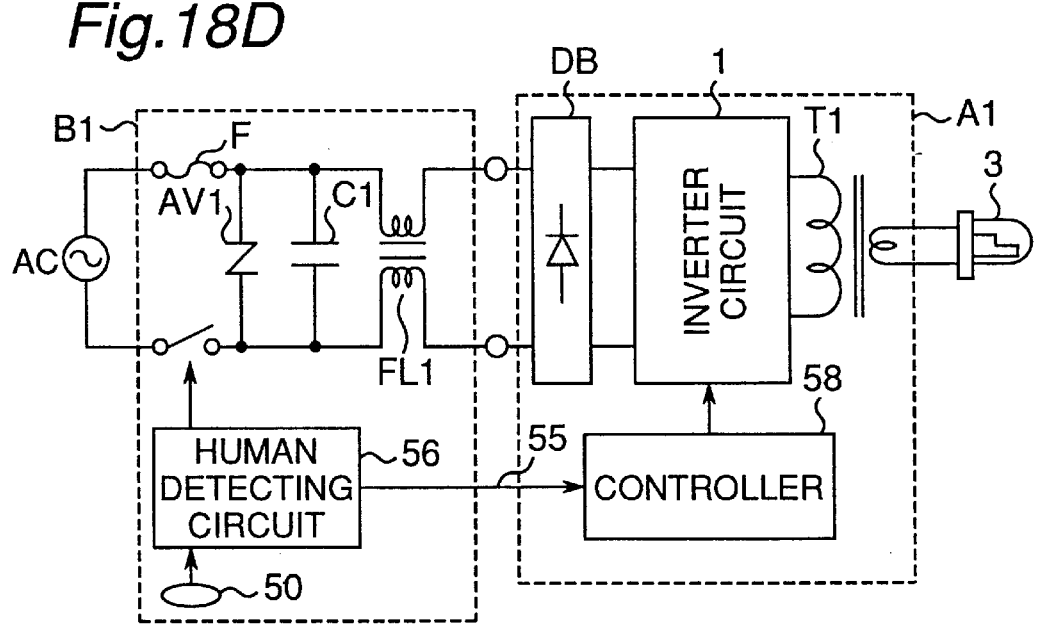
Figure 18E:
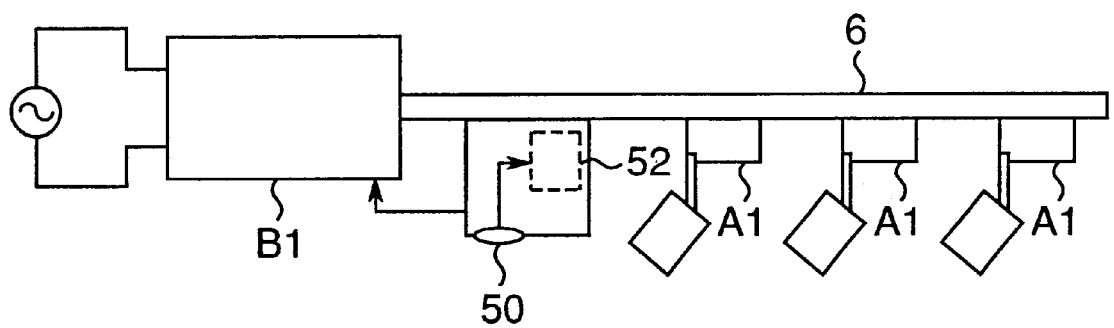
FIG. 18E is a view showing a state that a control circuit for realizing various control functions other than a supply of power is connected to a power track.

Furthermore, as shown in FIG. 18D, the power supply box may include a sensor 50 for detecting human presence, and a human detecting circuit 56 which outputs a detection signal based on an output of the sensor 50. The electronic transformer unit A1 may also include a control circuit 58 which performs a predetermined control based on a detection signal from the human detecting circuit 56. In this case, a communication line 55 is interposed between the power supply box and each electronic transformer unit so that the above detection signal is transmitted to the electronic transformer unit A1 via the communication line. At this time, the detection signal may be transmitted via a specific communication line, in a form of being overlapped with a supply voltage, or via radio communication. As described above, each electronic transformer unit includes the control circuit 58 which independently performs a predetermined control based on the detection signal. Thus, it is possible to independently control the lamp units provided in the identical power track. Incidentally, the above circuits for realizing various control functions may be connected to the power track 6 to be used in common to a plurality of electronic transfer units (see FIG. 18E). The sensor 50 may detect not only human presence but also brightness. The sensor 50 may comprise a device of which resistance varies based on the brightness.

(Fourth Embodiment)

The following is a description on a preferred organization of the inverter circuit 1 used in the above lighting system.

First, an operation of a conventional self-excitation half-bridge type inverter circuit will be described below with reference to FIG. 17.

As shown in FIG. 17, a series circuit comprising a resistor R1 and a capacitor C3, and a series circuit comprising capacitors C1 and C2 are connected between output terminals of a rectifier circuit DB. When an AC power supply AC is supplied, the capacitor C3 is charged via the resistor R1, and simultaneously, a pair of capacitors C1 and C2 is also charged. When voltage across the capacitor C3 reaches a breakover voltage (e.g., about 8V) of a trigger element Q3 comprising an SBS, the trigger element Q3 is turned on and then a base current flows through a transistor Q2 so that the transistor Q2 is turned on. When the transistor Q2 is turned on, an electric charge of the capacitor C2 is discharged via a primary winding of a step-down voltage transformer T1, a primary winding n1 of a current transformer CT1 and the transistor Q2, thereby generating a collector current flowing through the transistor Q2.

Subsequently, when a current flows through the primary winding n1 of the current transformer CT1, a current further flows through the base of the transistor Q2, increasing a collector current of the transistor Q2. The operation region of the transistor Q2 rapidly transfers into a saturation region.

After the collector current of the transistor Q2 becomes constant, in a short time, a current induced in a secondary winding n3 of the current transformer CT1 decreases, and therefore a base current of the transistor Q2 decreases. Then, the operation region of the transistor Q2 transfers from the saturation region into an active region. Whereby the collector current of the transistor Q2 decreases, and thus a current of the secondary winding n3 of the current transformer CT1 flows so as to further turn off the transistor Q2. Therefore, the transistor Q1 rapidly transfers into an off state. Simultaneously, a base current of a transistor Q1 flows so as to turn on the transistor Q1, and then the transistor Q1 is rapidly turned on. Thereafter, the transistor Q1 transfers into a saturated state. In that time, a current flowing through the primary winding of the step-down voltage transformer T1 can not be rapidly inverted due to a self-inductance of the transformer T1. Consequently, a regenerative current flows through the following path: the primary winding of the step-down voltage transistor T1→the primary winding n1 of the current transformer CT1→a diode D1→the capacitor C1. Thereafter, a current flows through the following path: the transistor Q1→the primary winding n1 of the current transformer CT1→the primary winding of the step-down voltage transformer T1→the capacitor C2.

When a short time passes after the collector current of the transistor Q1 becomes constant, a current induced in a secondary winding n2 of the current transformer CT1 decreases. Therefore, a base current of the transistor Q1 decreases, and then the operation region of the transistor Q1 transfers from the saturation region into an active region. The collector current of the transistor Q1 decreases, and thus a current of the secondary winding n2 of the current transformer CT1 flows so as to turn off the transistor Q1. Therefore, the transistor Q1 rapidly transfers into an off state. Simultaneously, a base current of a transistor Q1 flows so as to turn on the transistor Q1. The transistor Q2 is rapidly turned on, and then transfers into a saturated state. At that time, a current flowing through the primary winding of the step-down voltage transformer T1 can not be rapidly inverted due to a self-inductance of the step-down voltage transformer T1. A regenerative current flows along the following path: the step-down voltage transformer T1→the capacitor C2→a diode D2→the current transformer CT1. Thereafter, a current flows along the following path: the capacitor C1→the primary winding of the step-down voltage transformer T1→the primary winding n1 of the current transformer CT1→the transistor Q2.

Thereafter, the same phenomenon as above is repeated, and then the transistors Q1 and Q2 are alternately and repeatedly turned on and off. When a ripple current output of the rectifier circuit DB becomes in the vicinity of 0V, the power supply for maintaining an on/off (hereinafter, referred to as "oscillation") of the transistor Q1 and Q2, is not secured and the oscillation is stopped. Then, when the above ripple current output exceeds the vicinity of 0V, a voltage gradually steps up. Therefore, the capacitor C3 is again charged via the resistor R1. Subsequently, when the voltage reaches a breakover voltage of the trigger element Q3, the trigger element Q3 is turned on, and then a base current flows through the transistor Q2 to turn on the transistor Q2. Thereby, starting the oscillation. Next, a voltage corresponding to a turn radio of the step-down voltage transformer T1 is applied to a load (e.g., incandescent electric lamp) L connected to the secondary winding of the step-down voltage transformer T1, and thus a load L is lit.

In the above described inverter circuit, the diodes D1 and D2 for absorbing a regenerative current are individually connected in parallel in an anti-conductive direction with respect to the transition Q1 and Q2. Since the regenerative current is large, these diodes D1 and D2 are required to have large capacitance. Consequently, this is a factor of hindering a miniaturization of lighting system, and increasing a cost.

Figure 19:
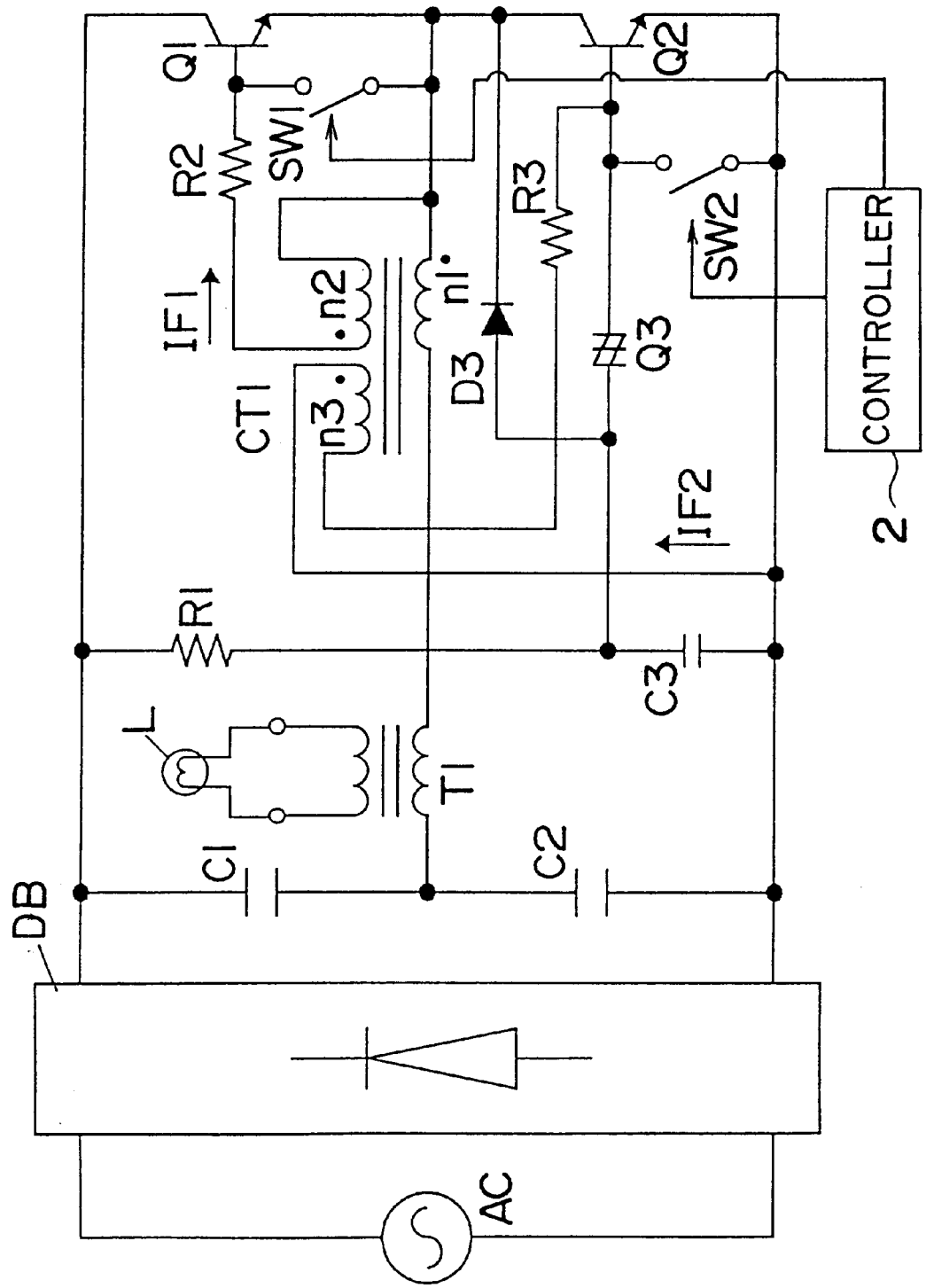
FIG. 19 is a view showing a preferred organization of an inverter circuit eliminating anti-parallel connection diodes of a lighting system according to the present invention.

In order to solve this problem, according to this fourth embodiment, an inverter circuit without diodes D1 and D2 are shown in FIG. 19 is provided. In FIG. 19, a power supply filter circuit which is at a pre-stage of the rectifier circuit is omitted.

As shown in FIG. 19, the inverter circuit includes a first switch SW1, a second switch SW2, and a control circuit 2. The first switch SW1 is capable of being turned on and off to short-circuit between a base and an emitter of the transistor Q1 which is a first switching element. The second switch SW2 is capable of being turned on and off to short-circuit between a base and an emitter of the transistor Q2 which is a second switching element. The control circuit 2 controls each switching operation of the first switch SW1 and the second switch SW2. The control circuit 2 turns on the first switch SW1 for only predetermined time Ts when the transistor Q1 is turned off, and turns on the second switch SW2 for only predetermined time Ts when the transistor Q2 is turned off. This circuit structure can eliminate the diodes D1 and D2 which are connected in anti-parallel with respect to the transistors Q1 and Q2 in the prior art.

The first and second switch SW1 and SW2 can be implemented by a semiconductor switching element (device) such as a bipolar transistor, like the transistors Q1 and Q2, and their on/off operation is controlled by the control circuit 2. The control circuit 2 detects each timing when the transistor Q1 and Q2 are turned off based on a current flowing through the primary winding n1 of the current transformer CT1 to control on/off operation of the first and second switches SW1 and SW2. The control circuit 2 can be implemented by employing a known technique.

In the inverter circuit shown in FIG. 19, when an AC power supply AC being supplied, the capacitor C3 is charged via the resistor R1 as well as a pair of capacitors C1 and C2. When a voltage across the capacitor C3 reaches the breakover voltage of the trigger element Q3, the trigger element Q3 is turned on, and a base current flows through a transistor Q2 to turn on the transistor Q2. When the transistor Q2 is turned on, an electric charge of the capacitor C2 is discharged via the primary winding of a step-down voltage transformer T1, the primary winding n1 of the current transformer CT1 and the transistor Q2 to flow a collector current into the transistor Q2.

When a current flows through the primary winding n1 of the current transformer CT1, a current flowing through the base of the transistor Q2 increases and the operation region of the transistor Q2 transfers into saturation region. At a short time passed after the corrector current of the transistor Q2 becomes constant, a current induced at the secondary winding n3 of the current transformer CT1 decreases, and thus the base current of the transistor Q2 decreases and the operation region transfers from the saturation region to the active region. Then, the corrector current of the transistor Q2 decreases, and therefore a current flowing through the second winding n3 of the current transformer CT1 flows to turn off the transistor Q2. The transistor Q2 transfers rapidly so as to off state. Simultaneously, the base current of the transistor Q1 flows so as to turn on the transistor Q1. The transistor Q1 rapidly turns on, transferring to a saturation state. At this time, since a current flowing the primary winding of the transformer T1 can not turnover quickly, a regenerative current IF1 flows.

Figure 20:
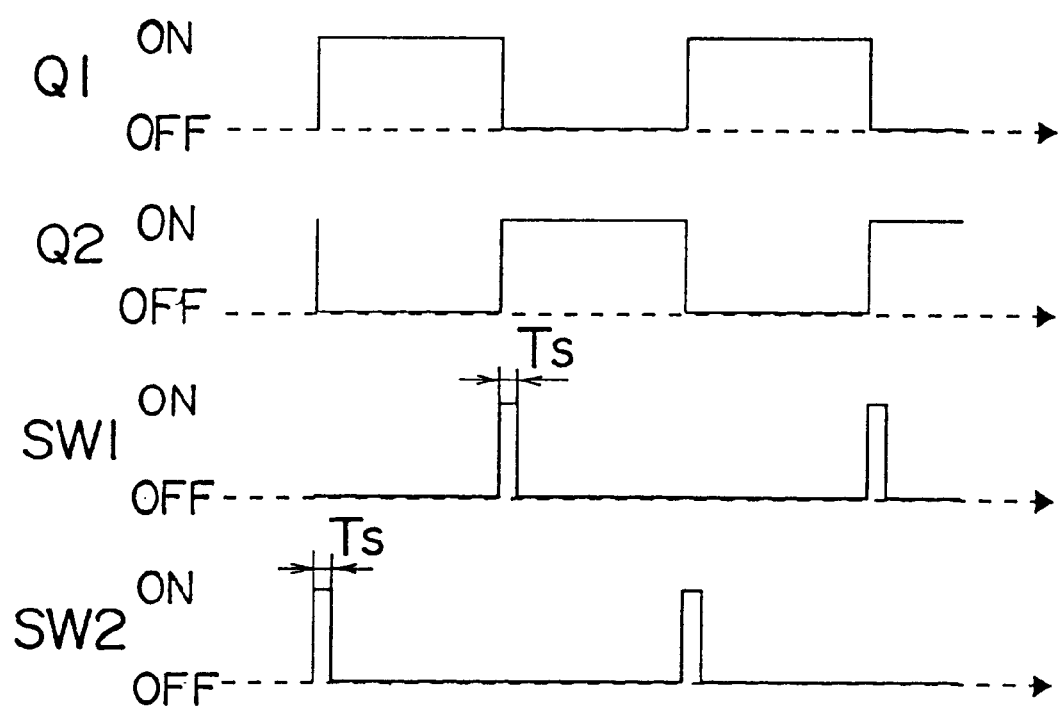
FIG. 20 is a view showing each on/off timing of transistor and switches of an inverter circuit having a preferred organization.

Since there is no diode D1, the regenerative current IF1 flows along the following path. More specifically, the regenerative current IF1 flows along the following path: the primary winding of the transformer T1 →the primary winding n1 of the transformer CT1→the secondary winding n2 of the transformer CT1→the resistor R2→the base-collector of the transistor Q1→the capacitor C1. At this time, a current flowing through one secondary winding n2 of the current transformer CT1 induces a current in the other secondary winding n3. Therefore, there is a problem that the transistor Q2 would be turned on. However, when detecting an off state of the transistor Q2, as shown in FIG. 20, the control circuit 2 turns on the second switch SW2 for only predetermined time Ts so as to short-circuit a base and an emitter of the transistor Q2. Thereby, it is possible to prevent the transistor Q2 from being turned on. The predetermined time Ts is set sufficiently longer than a time in which a current induced by the regenerative current IF1 can turns on the transistor Q2, and is set to a value sufficiently shorter than approximately half of an on/off period of the transistors Q1 and Q2.

Conversely, when the transistor Q1 is turned off and the transistor Q2 is turned on, a regenerative current IF2 flows along the following path: the primary winding of the transformer T1→the capacitor C2→the secondary winding n3 of the transformer CT1→the resistor R3→the base-collector of the transistor Q2→the primary winding n1 of the transformer CT1. At this time, by a current flowing through one secondary winding n3 of the current transformer CT1, a current is induced in the other secondary winding n2 thereof. Therefore, there is a problem that the transistor Q1 would be turned on. However, when detecting off state of the transistor Q1, as shown in FIG. 20, the control circuit 2 turns on the first switch SW1 for only predetermined time Ts so as to short-circuit a base-emitter of the transistor Q1. Thereby, it is possible to prevent the transistor Q1 from being turned on. The predetermined time Ts is set sufficiently longer than a time having a possibility that a current induced by the regenerative current IF2 turns on the transistor Q1, and is set to a value sufficiently shorter than approximately half of an on/off period of the transistors Q1 and Q2.

As is evident from the above description, according to this fourth embodiment, the regenerative currents IF1 and IF2 flow through the base-corrector of the transistors Q1 and Q2 via the secondary windings n2 and n3 of the current transformer CT1. The regenerative current IF2 after the transistor Q1 is turned off flows through one secondary winding n3 of the current transformer CT1, and thereby a current is induced in the other secondary winding n2 thereof. Then, the control circuit 2 turns on the first switch SW1 to prevent the transistor Q1 from being turned on by the above induced current. Moreover, the regenerative current IF1 after the transistor Q2 is turned off flows through one secondary winding n2 of the current transformer CT1, and thereby a current is induced in the other secondary winding n3 thereof. Then, the control circuit 2 turns on the second switch element SW2 to prevent the transistor Q2 from being turned on by the induced current. Consequently, it is possible to prevent series-connected two transistors Q1 and Q2 from being simultaneously turned on, and to eliminate the diodes for supplying the regenerative currents IF1 and IF2. Therefore, a cost reduction and miniaturization of the lighting system can be achieved. In this fourth embodiment, even if the primary winding of the step-down voltage transformer T1 and the primary winding n1 of the current transformer CT1 is changed in their circuit positional relation, there would be no influence and difference in a circuit operation, and of course, the same effect as above can be obtained.

Figure 21:
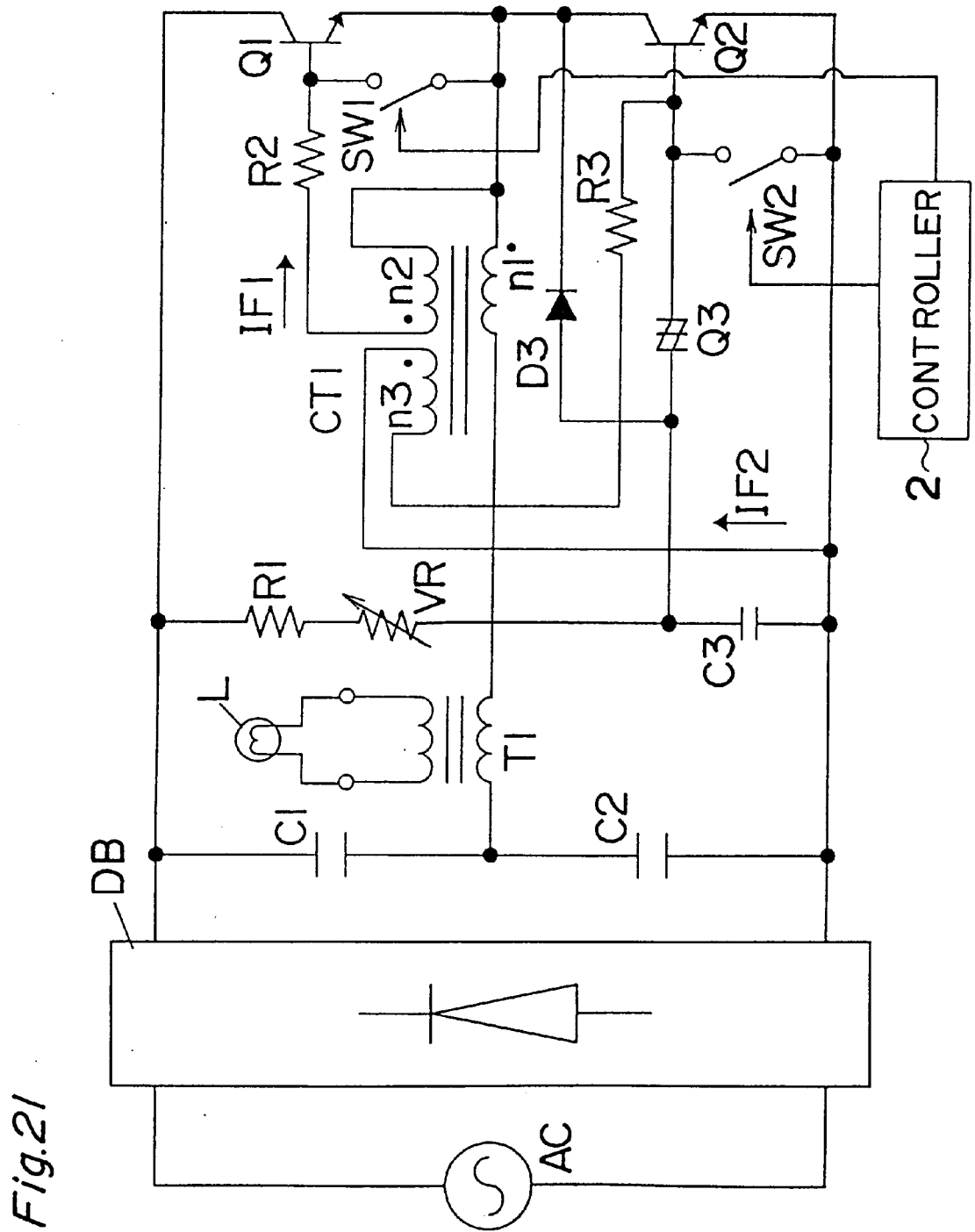
FIG. 21 is view showing an another preferred organization of an inverter circuit eliminating anti-parallel connection diodes of a lighting system according to the present invention.

By the way, in this fourth embodiment, as shown in FIG. 21, a variable resistor VR could be connected in series with the resistor R1 so as to vary a resistance value of the variable resistor VR, and thereby, a lighting control (dimming) of an incandescent lamp L may be carried out. More specifically, in accordance with a resistance value of the variable resistor VR, it is possible to vary a timing at which a charging voltage of the capacitor C3 reaches a breakover voltage of the trigger element Q3, and thereby to vary an energy supplied to the incandescent lamp L every a half period of alternating current power supply AC. Thus, a lighting control (dimming) can be performed.

Fifth Embodiment

Figure 22:
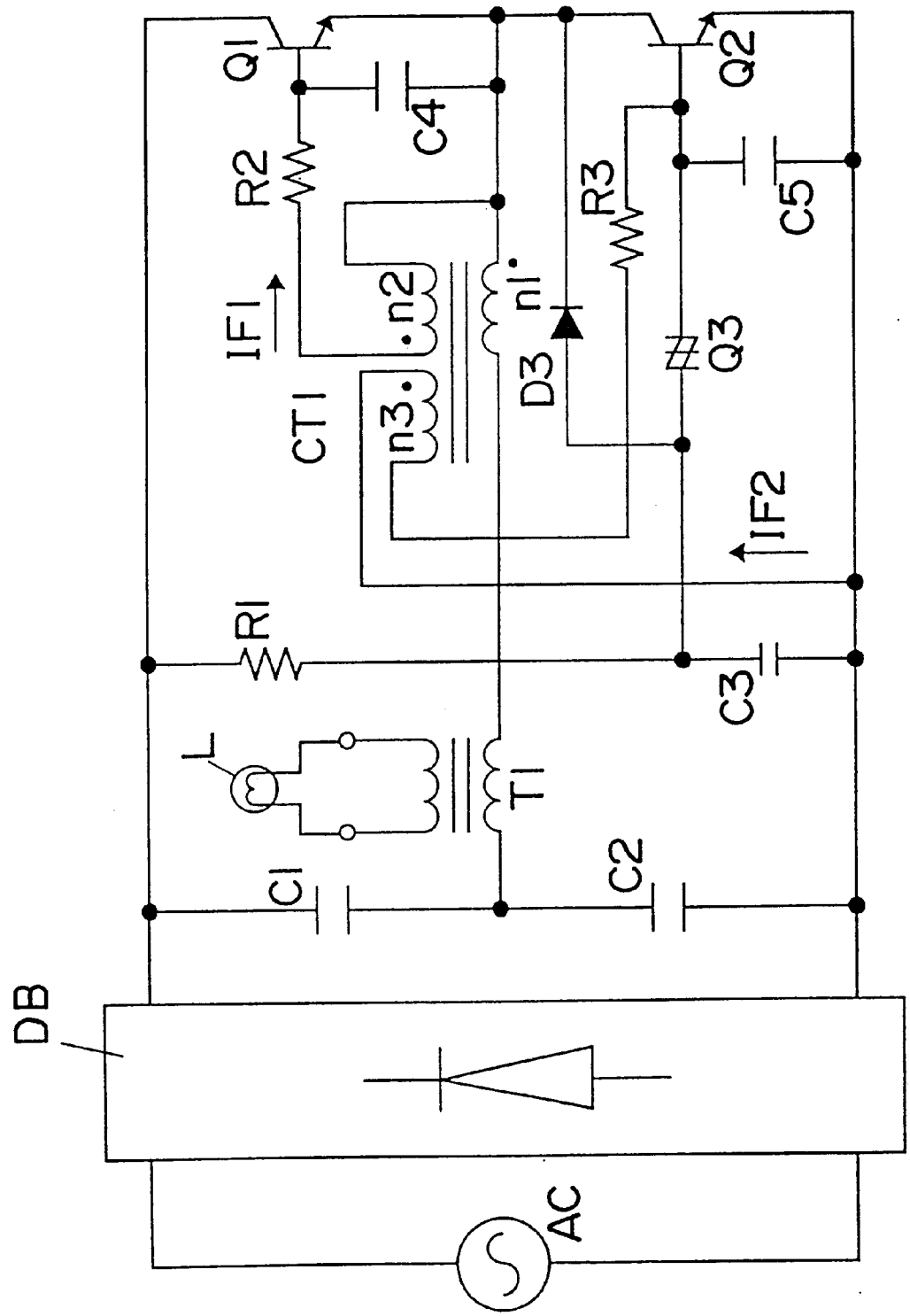
FIG. 22 is a view showing still another preferred organization of an inverter circuit eliminating anti-parallel connection diodes of a lighting system according to the present invention.

FIG. 22 shows another preferred organization of an inverter circuit used in the lighting system according to the present invention.

In the inverter circuit shown in FIG. 22, in place of the first and second switch SW1 and SW2 and the control circuit 2 shown in FIG. 19, a first capacitor C4 is connected between the base and emitter of the transistor Q1, and a second capacitor C5 is connected between the base and emitter of the transistor Q2. By this organization of the inverter circuit, it is possible to remove diodes D1 and D2 which are connected in an anti-parallel with respect to the transistor Q1 and Q2 in the prior art.

An oscillation operation of the inverter circuit constructed as described above is basically the same as the inverter circuit shown in FIG. 19. When the transistor Q2 is turned off and the transistor Q1 is turned on, the regenerative current IF1 flows along the following path: the primary winding of the step-down voltage transformer T1 →the primary winding n1 of the current transformer CT1→the secondary winding n2 of the current transformer CT1→the resistor R2→the base-collector of the transistor Q1 →the capacitor C1. At this time, a current flowing through one secondary winding n2 of the current transformer CT1 induces a current in the other secondary winding n3 thereof so as to try to turn on the transistor Q2. However, the current induced in the secondary winding n3 is absorbed by a filter circuit comprising the resistor R3 connected to the secondary winding n3 and the second capacitor C5. Thereby, it is possible to prevent the transistor Q2 from being turned on. A time constant of the above filter circuit is set to a value such that the current induced by the regenerative current IF1 does not turn on the transistor Q2.

Conversely, when the transistor Q1 is turned off and the transistor Q2 is turned on, the regenerative current IF2 flows along the following path: the primary winding of the step-down voltage transformer T1→the capacitor C2→the secondary winding n3 of the current transformer CT1→the resistor R3→the base-collector of the transistor Q2→the primary winding n1 of the current transformer CT1. At this time, a current flowing through one secondary winding n3 of the current transformer CT1 induces a current in the other secondary winding n2 so as to try to turn on the transistor Q1. However, the current induced in the secondary winding n2 is absorbed b a filter circuit comprising the resistor R2 connected to the secondary winding n2 and the first capacitor C4. Thereby, it is possible to prevent the transistor Q1 from being turned on . A time constant of the above filter circuit is set to a value such that the current induced by the regenerative current IF2 does not turn on the transistor Q1.

As described above, according to the present embodiment, the regenerative currents IF1 and IF2 flow through the base and the corrector of the transistors Q1 and Q2 via the secondary windings n2 and n3 of the current transformer CT1. After the transistor Q1 is turned off, the regenerative current IF2 flows through one secondary winding n3 of the current transformer CT1. Thereby, a current induced in the other secondary winding n2 of the transformer CT1 is absorbed by the first capacitor C4. Therefore, it is possible to prevent the transistor Q1 from being turned on. Moreover, after the transistor Q2 is turned off, the regenerative current IF1 flows through one secondary winding n2 of the current transformer CT1. Thereby, a current induced in the other secondary winding n3 of he transformer CT1 is absorbed by the second capacitor C5. Therefore, it is possible to prevent the transistor Q2 from being turned on. As a result, it is possible to prevent series-connected two transistors Q1 and Q2 from being simultaneously turned on, and to dispense the diodes for bypassing the regenerative currents IF1 and IF2. Therefore, a cost reduction and miniaturization of the lighting system can be achieved. In addition, according to this fifth embodiment, there is no need of providing the control circuit 2 for controlling an on/of switching of the first and second switches SW1 and SW2 like the inverter circuit of the above fourth embodiment. Accordingly, a simple and low-cost lighting system can be implemented as compared with the above fourth embodiment. In this fifth embodiment, even if the primary winding of the step-down voltage transformer T1 and the primary winding n1 of the current transformer CT1 are changed in their circuit positonal relation, there is no influence and difference in a circuit operation, and of course, the same effect as above can be obtained.

Sixth Embodiment

Figure 23:
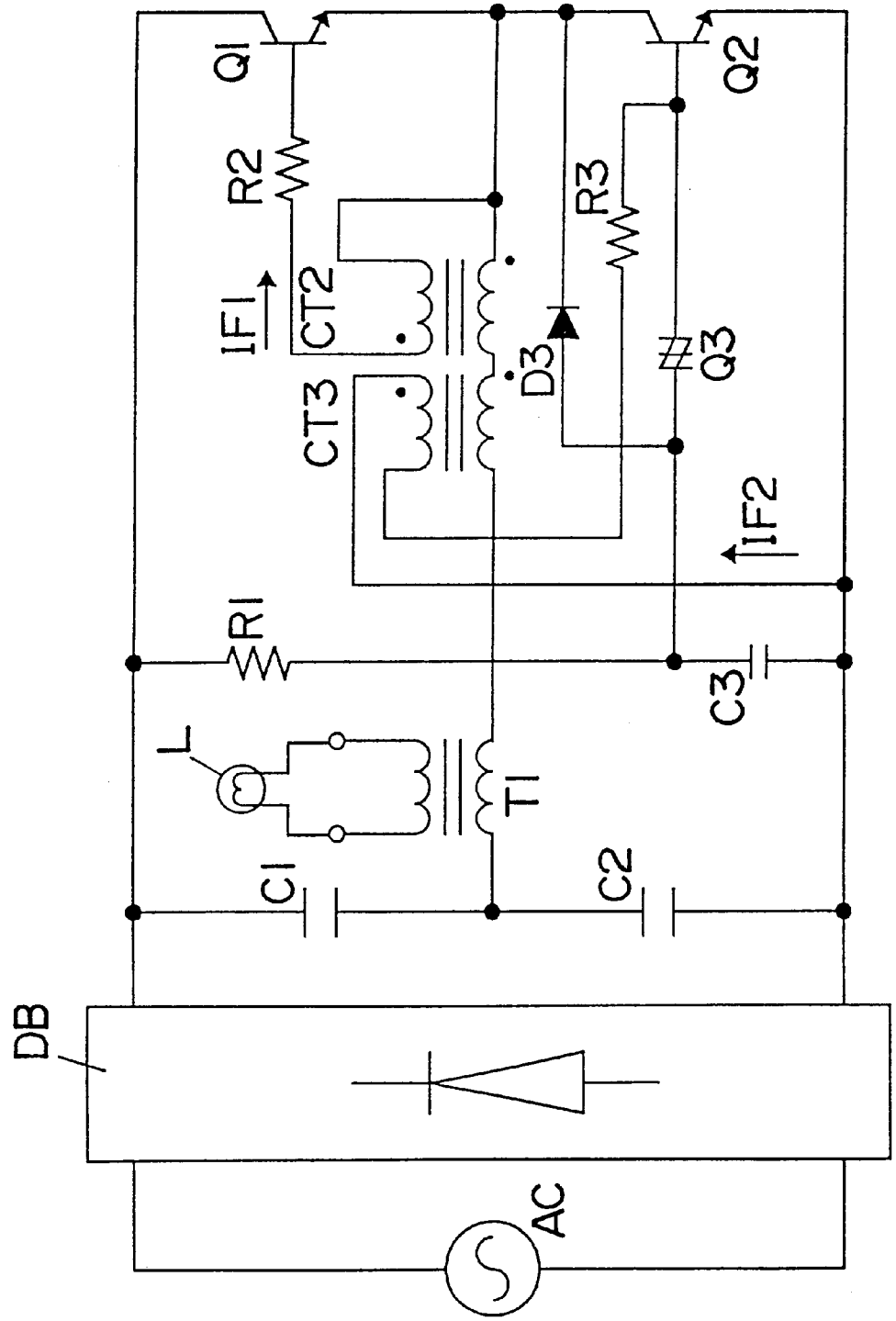
FIG. 23 is a view showing still another preferred organization of an inverter circuit eliminating anti-parallel connection diodes of a lighting system according to the present invention.

FIG. 23 shows still another preferred embodiment of an inverter circuit of the lighting system according to the present invention.

The inverter circuit of this sixth embodiment is provided with a first current transformer CT2 for driving the transistor Q1 and a second current transformer CT3 for driving the transistor Q2, in place of the current transformer CT1 included in the inverter circuit shown in FIG. 19. By this organization of the inverter circuit, diodes D1 and D2 which are connected in an anti-parallel to the transistors Q1 and Q2 in the prior art can be removed. Each primary winding of the first and second current transformers CT2 and CT3 is connected in series to the primary winding of the step-down voltage transformer T1.

An oscillation operation of the inverter circuit of this sixth embodiment is the same as above.

The regenerative current IF1 flows along the following path: the primary winding of the step-down voltage transformer T1→the primary winding of the second current transformer CT3→the primary winding of the first current transformer CT2→the resistor R2→the base the and collector of the transistor Q1→the capacitor C1. The inverter circuit of this sixth embodiment is different from the circuits of the above fourth and fifth embodiments. Even if the regenerative current IF1 flows through the secondary winding of the first current transformer CT2, no current is induced in the secondary winding of the second current transformer CT3 and no current is generated to turn on the transistor Q2.

The regenerative current IF2 flows along the following path: the primary winding of the step-down voltage transformer T1→the capacitor C2→the resistor R3→the base and collector of the transistor Q2→the primary winding of the first current transformer CT2→the primary winding of the second current transformer CT3. The inverter circuit of this sixth embodiment is different from those of the above fourth and fifth embodiments. Even if the regenerative current IF2 flows through the secondary winding of the second current transformer CT3, no current is induced in the secondary winding of the first current transformer CT2 and no current is generated to turn on the transistor Q1.

As is evident from the above description, according to this sixth embodiment, the regenerative currents IF1 and IF2 flow through the base-emitter of the transistors Q1 and Q2 via the secondary windings of the first and second current transformers CT2 and CT3; therefore, there is no need of providing the diodes for supplying the regenerative currents IF1 and IF2. As a result, a cost reduction and miniaturization can be achieved. In addition, even if the regenerative current IF2 after the transistor Q1 is turned off flows through the secondary winding of the second current transformer CT3, no current is induced in the secondary winding of the first current transformer CT2, and further, even if the regenerative current IF1 after the transistor Q2 is turned off flows through the secondary winding of the first current transformer CT2, no current is induced in the secondary winding of the second current transformer CT3. Therefore, it is possible to prevent two transistors Q1 and Q2 from being simultaneously turned on. In this sixth embodiment, even if the primary winding of the step-down voltage transformer T1 and each primary winding of the first and second current transformers CT2 and CT3 are changed in their circuit positional relation, there is no influence and difference in a circuit operation, and of course, the same effect as above can be obtained.

Seventh Embodiment

Next, the following is a description on a preferred embodiment of mounting circuit components of the electronic transformer unit A1 in the lighting system according to the present invention on a printed circuit board.

Figure 24:
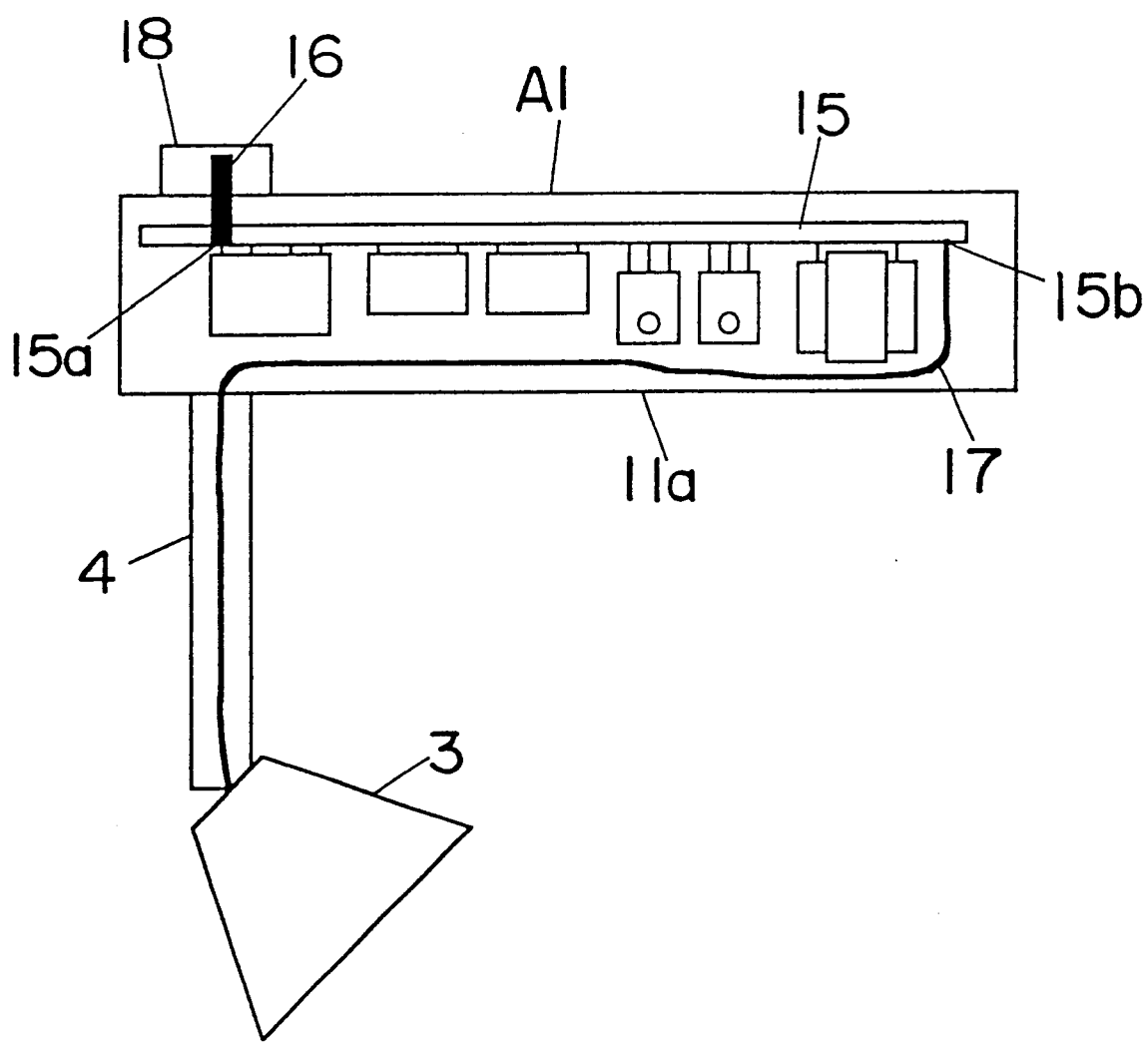
FIG. 24 is a view to explain a state that a power supply line and a load line of the electronic transformer unit of the lighting system according to the present invention is mounted in a conventional method.

As shown in FIG. 24, the electronic transformer unit A1 is usually received in a housing 11a. The housing 11a receives a printed circuit board 15 on which circuit components including an inverter circuit is mounted, and is connected with a feed unit 18 for inputting an AC voltage supplied from a commercial power supply. The feed unit 18 and the printed circuit board 15 are electrically connected by a power supply line 16 at a connecting point 15a. The lighting load 3 and the printed circuit board 15 are electrically connected by a load line 17 at a connecting point 15b. The power supply line 16 is connected to an input terminal of the diode bridge DB. The load line 17 connects the step-down voltage transformer T1 and the load L. The feed unit 18 has a function as a connecting metal fitting for providing an electrical connection and mechanical support to the power track. By connecting the feed unit 18 to the power track provided on a ceiling or the like, the electronic transformer unit A1 is electrically connected thereto, and the housing 11a is mechanically supported to the power track.

Since a high frequency current flows through the load line 17, a high frequency noise is easy to be generated. Accordingly, the power supply line 16 and the load line 17 must be wired separately with a predetermined distance therebetween so that the power supply line 16 has no influence by a high frequency noise. As described above, placing the power supply line 16 separately from the load line 17 with a predetermined distance prevents the electronic transformer unit from being miniaturized. To overcome this disadvantage, this seventh embodiment provides a printed board and a mounting method capable of placing the power supply line 16 close to the load line 17.

Figure 25A:
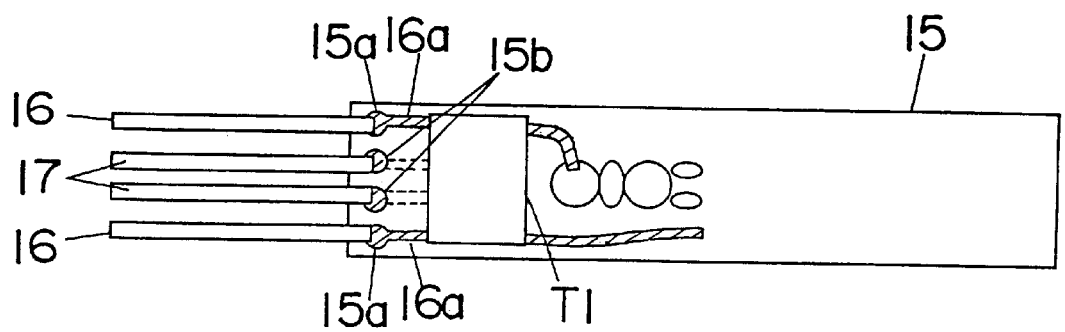
FIG. 25A is a view showing a mounting surface of a printed circuit board on which circuit components of the electronic transformer unit of the lighting system according to the present invention are mounted.
Figure 25B:
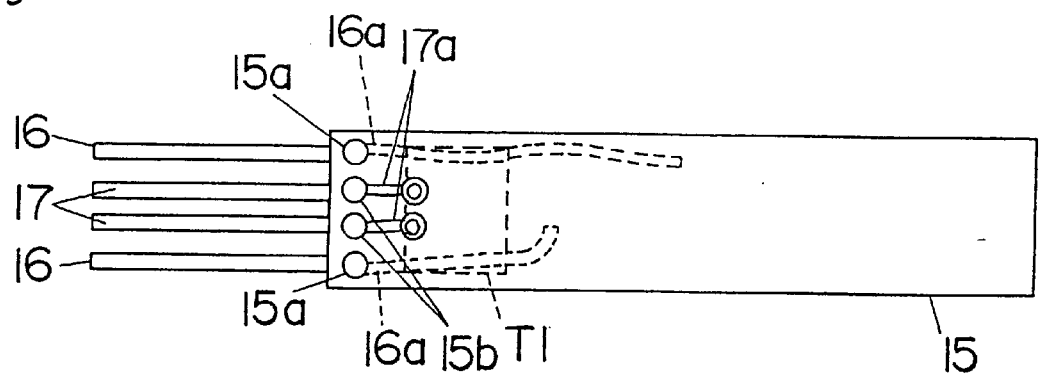
FIG. 25B is a view showing a soldering surface of a printed circuit board on which circuit components of the electronic transformer unit of the lighting system according to the present invention are mounted.

FIGS. 25A and 25B are views showing a printed circuit board according to the present invention. The printed circuit board 15 shown in these FIGS. 25A and 25B is a double sided printed board. FIG. 25A is a view showing a mounting surface of the printed board, and FIG. 25B a view showing a soldering surface of the printed board.

As shown in FIG. 25A, in the printed board 15, a wiring pattern 16a connected to the power supply line 16 via the connecting point 15a is formed on the mounting surface on which the components are mounted. As shown in FIG. 25B, a wiring pattern 17a connected to the load line 17 via the connecting point 15b is formed on the soldering surface. As described above, the wiring pattern 16a connected to the power supply line 16 and the wiring pattern 17a connected to the load line 17 are formed on the double side of the printed wiring board, that is, a component mounting surface and soldering surface, and thereby, interference between these wiring patterns can be reduced.

Further, a step-down voltage transformer T1 connected by the connecting point 15b and the wiring pattern 17a is placed in the vicinity of the connecting point 15b so as to shorten the wiring pattern 17a. A high frequency current flows through the wiring pattern 17a and a noise tends to be generated. However, shortening a wiring pattern length can suppress a generating of noise.

Furthermore, the wiring pattern 16a and the wiring pattern 17a are arranged in substantially parallel with each other by a predetermined length, and anti-phase currents flow through their wiring patterns 16a and 17a. The anti-phase current flowing through their wiring patterns 16a and 17a, for example, are obtained by adjusting a method of winding the windings of the step-down voltage transformer T1 and a filter inductor FL1. Consequently, a noise generated in one of wiring patterns can be canceled by a noise having a reverse polarity induced in the other of the wiring patterns. Therefore, wiring patterns 16a and 17a which are substantially parallel and have length set to a proper value can suppress a mutual interference of these wiring patterns. The proper value is set to a value capable of mutually canceling the noise generated in these wiring patterns 16a and 17a.

Figure 26:
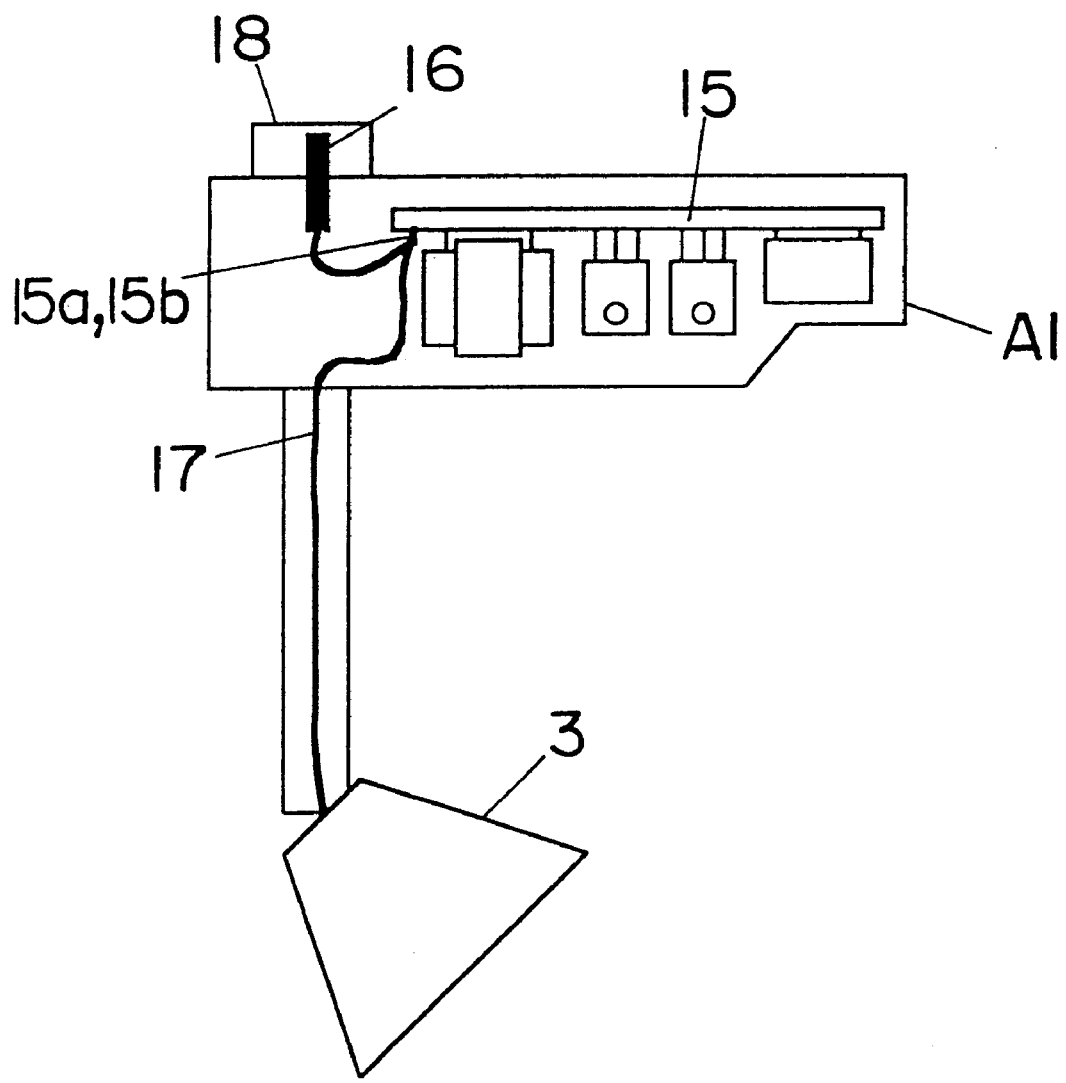
FIG. 26 is a view to explain a state that a power supply line and a load line of the electronic transformer unit of the lighting system according to the present invention are mounted.
Figure 27A:
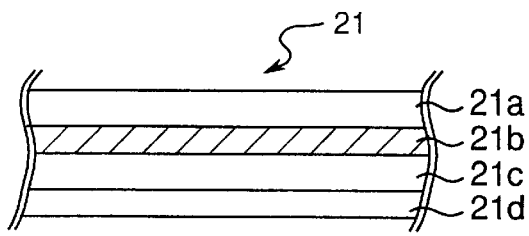
FIGS. 27A, 27B, 27C, 27D and 27E are views showing a printed circuit board having multilayers (four layers) on which circuit components of the electronic transformer unit of the lighting system according to the present invention are mounted.
Figure 27B:
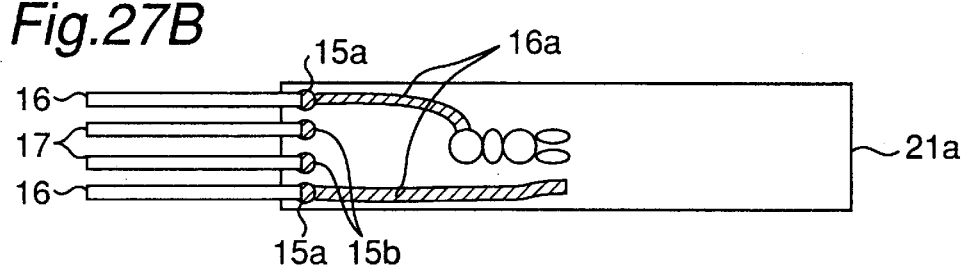
Figure 27C:
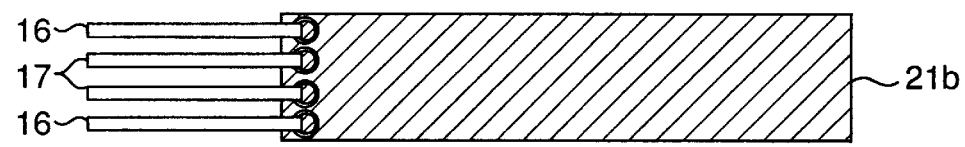
Figure 27D:
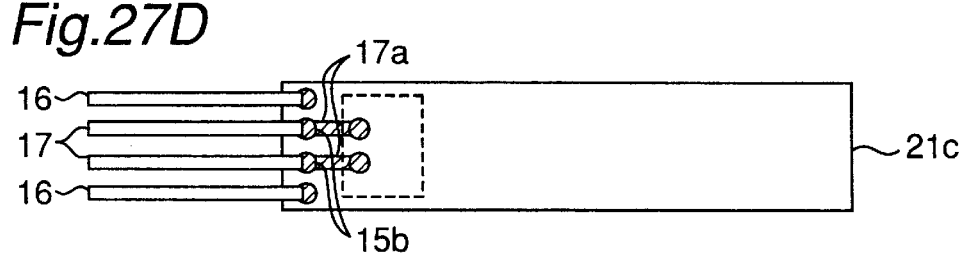
Figure 27E:
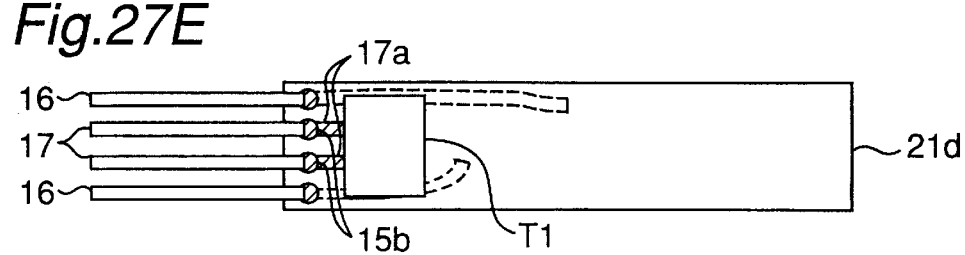

With the above organization, it is possible to suppress a mutual interference between the wiring patterns 16a and 17a. As a result, as shown in FIG. 26, the connecting points 15a and 15b are placed at a position close to the feed unit 18 on the printed board 15, so that the lighting system can be miniaturized. In the above manner, the lighting system is miniaturized, and thereby a radiant heat from an incandescent lamp as a lighting load can be suppressed.

also, in the case where the printed board has a multilayer structure as shown in FIG. 27A, the wiring pattern 16a connected to the power supply line 16 and the wiring pattern 17a connected to the load line 17 may be individually formed on different layer. For example, as shown in FIGS. 27B to 27E, the writing pattern 16a connected to the power supply line 16 may be formed on the first layer 21a, and the writing pattern 17a connected to the load line 17 may be formed on the third and fourth layers 21c and 21d.

The present invention has been described on the basis of the above specified embodiments. It is apparent for the person skilled in the art to make other various modification examples, changes and other utility. Thus, the present invention is not limited to specified disclosure, and is capable of being limited by only attached scope of the invention.

What is claimed is:

1. A lighting system having a power supply filter circuit having an input end connected to an alternating current power supply, rectifier circuit connected to an output end of the power supply filter circuit, an inverter circuit for outputting a high frequency voltage, the inverter circuit being connected to an output end of the rectifier circuit and having switching elements through which the inverter circuit is controlled by on and off operation thereof, a lamp load which receives a high frequency output from the inverter circuit to light, a power track for providing a supply voltage to the lamp load, said lighting system comprising:

a first unit which includes at least the power supply filter circuit, said first unit being interposed between the alternating current power supply and an input end of the power track; and a second unit for outputting a high frequency voltage to the lamp load, said second unit being connected to the power track and being provided as a structure separate from the first unit, thereby at least one second unit is connected wit the power track.

2. The lighting system according to claim 1, wherein said second unit includes the rectifier circuit and the inverter circuit.

3. The lighting system according to claim 1, wherein said first unit further includes the rectifier circuit, and said second unit includes the inverter circuit.

4. The lighting system according to claim 1, wherein said first unit further includes the rectifier circuit and a smoothing capacitor, and said second unit includes the inverter circuit.

5. The lighting system according to claim 4, wherein said rectifier circuit is a chopper circuit for correcting a power factor of an input power from the alternating current power supply.

6. The lighting system according to claim 1, wherein said first unit further includes a control circuit for carrying out a predetermined control to the second unit other than a power supply.

7. The lighting system according to claim 1, wherein said power track is connected with a control circuit for carrying out a predetermined control to the second unit other than a power supply.

8. The lighting system according to claim 7, wherein said control circuit provides a supply voltage which controls on-off operation of the lamp load based on a signal from a sensor.

9. The lighting system according to claim 7, wherein said control circuit provides a supply voltage which is controlled in phase based on a signal from a sensor.

10. The lighting system according to claim 1, wherein said lamp load is a halogen lamp.

11. The lighting system according to claim 1, wherein said power supply filter circuit includes a protective circuit for protecting a circuit from an over-current.

12. The lighting system according to claim 1, wherein said inverter circuit includes:

a first series circuit which comprises a first and a second switching element and is connected in parallel wit the output end of the rectifier circuit;

a second series circuit comprising a first and a second capacitors, said series circuit being connected in parallel with the output end of the rectifier circuit;

a drive transformer for driving the first and second switching elements; and an output transformer which is connected with the lamp load on a secondary side, thereby the drive transformer and a primary side of the output transformer is connected in series between a connecting point of the first and second switching elements and a connecting point of the first and second capacitors.

13. The lighting system according to claim 1, wherein said second unit is received in a housing which is removably fastened to and connected with the power track via a connecting metal fitting.

14. The lighting system according to claim 1, wherein said lamp load is provided in a lamp unit which is suspended form the second unit.

15. The lighting system according to claim 1, wherein said inverter circuit comprises:

a first series circuit which is connected to the output end of the rectifier circuit, and comprises first and second switching elements each having a first electrode, a second electrode and a control electrode;

a second series circuit comprising a pair of capacitors which is connected in parallel with the first series circuit;

a step-down voltage transformer having a secondary winding connected with an incandescent lamp as a load;

a current transformer having a pair of secondary windings each connected to the control electrode of the first or second switching elements via a current limiting resistor, respectively, a primary winding of the step-down voltage transformer and a primary winding of the current transformer being connected in series between a connecting point of the first and second switching elements and a connecting point of the pair of capacitors;

a first switch for connecting the control electrode of the first witching element with a lower potential side electrode of the first and second electrodes, when turned on;

a second witch for connecting the control electrode of the second switching element with a lower potential side electrode of the first and second electrodes, when turned on; and a controller for turning on the first switch for only predetermined time when the first switching element is turned off, and for turning on the second switch for only a predetermined time when the second switching element is turned off, the predetermined time being set shorter than a time of approximately half of a switching period of the first and second switches.

16. The lighting system according to claim 1, wherein said inverter circuit comprises:

a first series circuit which is connected with the output end of the rectifier circuit, and comprises first and second switching elements each having a first electrode, a second electrode and a control electrode;

a second series circuit comprising a pair of capacitors which is connected with the output end of the rectifier circuit in parallel wit the first series circuit;

a step-down voltage transformer having a secondary winding connected with an incandescent lamp as a load;

a current transformer having a pair of secondary windings each connected to the control electrode of the first or second switching elements via a current limiting resistor, respectively, a primary winding of the step-down voltage transformer and a primary winding of the current transformer being connected in series between a connecting point of the first and second switching elements and a connecting point of the pair of capacitors;

a first capacitor interposed between the control electrode and a lower potential side electrode of the first and second electrodes of the first switching element; and a second capacitor interposed between the control electrode and a lower potential side electrode of the first and second electrodes of the second switching element.

17. The lighting stem according to claim 1, wherein said inverter circuit comprises:

a first series circuit which is connected with the output end of the rectifier circuit, and comprises first and second switching elements each having a control electrode;

a second series circuit comprising a pair of capacitors which is connected in parallel with the first series circuit;

a step-down voltage transformer having a secondary winding connected with an incandescent lamp as a load;

a first current transformer having a secondary winding connected to the control electrode of the first switching element; and a second current transformer having a secondary winding connected to the control electrode of the second switching element, a primary winding of the step-down voltage transformer and secondary windings of the first and second current transformers being connected in series between a connecting point of the first and second switching elements and a connecting point of the pair of capacitors.

18. The lighting system according to claim 1, further comprising a double sided printed circuit board on which circuit components included in the second unit are mounted, whereby a wiring pattern connected with a power supply line and a wiring pattern connected with a load line are individually formed on different side of the printed circuit board.

19. The lighting system according to claim 1, further comprising a multilayer printed circuit board on which circuit components included in the second unit are mounted, and wherein a wiring pattern connected with a power supply line and a wiring pattern connected with a load line are individually formed on different layer of the printed circuit board.

20. The lighting system according to claim 1, further comprising a printed circuit board on which circuit components included in the second unit are mounted, and wherein a wiring pattern connected with a power supply line and a wiring pattern connected with a load line are formed substantially parallel with each other on the printed circuit board with a predetermined length, and each current flowing through the respective wiring pattern has mutually an anti-phase.

21. The lighting system according to claim 18, wherein the wiring pattern connected with a power supply line and the wiring pattern connected with the load line are formed substantially parallel with each other on the printed circuit board with a predetermined length, and each current flowing through the respective wiring pattern has mutually an anti-phase.

22. The lighting system according to claim 19, wherein the wiring pattern connected with a power supply line and the wiring pattern connected with the load line are formed substantially parallel with each other on the printed circuit board with a predetermined length, and each current flowing through the respective wiring pattern has mutually an anti-phase.

* * * * *

UNITED STATES PATENT AND TRADEMARK OFFICE
CERTIFICATE OF CORRECTION

PATENT NO. : 6,246,182 B1  
DATED : June 12, 2001  
INVENTOR(S) : S Yamasaki et al.

Page 1 of 1

It is certified that error appears in the above-identified patent and that said Letters Patent is hereby corrected as shown below:

Column 15,  
Line 4, before "rectifier" insert -- a --.  
Lines 21 and 59, "wit" should be -- with --.

Column 16,  
Line 12, "form" should be -- from --.  
Line 35, "witching" should be -- switching --.  
Line 38, "witch" should be -- switch --.  
Line 57, "wit" should be -- with --.

Signed and Sealed this

Twenty-ninth Day of January, 2002

Attest:

Attesting Officer

JAMES E. ROGAN  
Director of the United States Patent and Trademark Office